(12) United States Patent
Park et al.

(10) Patent No.: US 11,758,559 B2
(45) Date of Patent: *Sep. 12, 2023

(54) METHOD AND APPARATUS FOR TRANSMITTING AND RECEIVING CONTROL INFORMATION IN WIRELESS COMMUNICATION SYSTEM

(71) Applicant: Samsung Electronics Co., Ltd., Gyeonggi-do (KR)

(72) Inventors: Sung-jin Park, Incheon (KR); Tae-hyoung Kim, Seoul (KR); Jeong-ho Yeo, Gyeonggi-do (KR); Jin-young Oh, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/580,949

(22) Filed: Jan. 21, 2022

(65) Prior Publication Data

US 2022/0150874 A1 May 12, 2022

Related U.S. Application Data

(63) Continuation of application No. 16/645,335, filed as application No. PCT/KR2018/008627 on Jul. 30, 2018, now Pat. No. 11,265,859.

(30) Foreign Application Priority Data

Sep. 20, 2017 (KR) .................. 10-2017-0121320

(51) Int. Cl.
*H04W 72/04* (2023.01)
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .......... H04W 72/0446; H04W 72/042; H04W 72/1289; H04W 72/044; H04L 5/0053; H04L 5/005; H04L 5/0048; H04L 5/0007
See application file for complete search history.

(56) References Cited

U.S. PATENT DOCUMENTS 7,818,580 B2   10/2010   Bardsley
9,628,237 B2    4/2017   Kim et al.
(Continued)

FOREIGN PATENT DOCUMENTS

CN   103098536   5/2013
CN   104937865   9/2015
(Continued)

OTHER PUBLICATIONS

Huawei et al., "On Pre-emption Indication for DL Multiplexing of URLLC and eMBB", R1-1715409, 3GPP TSG RAN WG1 Ad Hoc Meeting, Sep. 18-21, 2017, 15 pages.
(Continued)

*Primary Examiner* — Wei Zhao
(74) *Attorney, Agent, or Firm* — The Farrell Law Firm, P.C.

(57) ABSTRACT

Provided is a method of transmitting and receiving control information in a wireless communication system, and an apparatus therefor. The method may include receiving interruption configuration information via upper signaling from a base station (BS), when a format of an interruption indicator transmitted from the BS to a user equipment is determined based on the received interruption configuration information, searching for the interruption indicator, and identifying, based on the format of the interruption indicator, information included in the interruption indicator detected as a result of the searching.

20 Claims, 13 Drawing Sheets

(56) References Cited

U.S. PATENT DOCUMENTS

| | | | |
|---|---|---|---|
| 9,877,290 | B2 | 1/2018 | Aiba et al. |
| 9,923,659 | B2 | 3/2018 | Kang et al. |
| 10,123,319 | B2 | 11/2018 | Papasakellarou et al. |
| 10,143,032 | B2 | 11/2018 | Kela et al. |
| 10,397,938 | B2 | 8/2019 | Lee et al. |
| 11,071,172 | B2 * | 7/2021 | He ................. H04L 1/1614 |
| 11,395,293 | B2 | 7/2022 | Yeo et al. |
| 2016/0113008 | A1 | 4/2016 | Damnjanovic et al. |
| 2020/0119895 | A1 * | 4/2020 | Choi ................ H04L 5/0053 |
| 2020/0187236 | A1 * | 6/2020 | Moon ................ H04L 5/0044 |

FOREIGN PATENT DOCUMENTS

| | | |
|---|---|---|
| CN | 106027220 | 10/2016 |
| CN | 107104779 | 8/2017 |
| JP | 2017-515410 | 6/2017 |
| WO | WO 2011/002263 | 1/2011 |
| WO | WO 2016/159730 | 10/2016 |
| WO | WO 2016/208829 | 12/2016 |

OTHER PUBLICATIONS

CATT, "[89-20] Email Discussion: Group-common PDCCH for NR", R1-1710968, 3GPP TSG RAN WG1 Meeting #AH_NR2, Jun. 27-30, 2017, 22 pages.

ZTE et al., "About DL Pre-emption Indication", R1-1715561, 3GPP TSG RAN1-NR#3, Sep. 18-21, 2017, 9 pages.

Huawei et al., "Remaining Details on Group-common PDCCH", R1-1715396, 3GPP TSG RAN WG1 Meeting AH_NR#3, Sep. 18-21, 2017, 6 pages.

International Search Report dated Nov. 8, 2018 issued in counterpart application No. PCT/KR2018/008627, 5 pages.

Written Opinion dated Nov. 8, 2018 issued in counterpart application No. PCT/KR2018/008627, 12 pages.

InterDigital Inc., "Remaining Details of Pre-emption Indication for DL", R1-1714162, 3GPP TSG RAN WG1 Meeting #90, Aug. 21-25, 2017, 3 pages.

European Search Report dated Jul. 1, 2020 issued in counterpart application No. 18859301.6-1205, 10 pages.

Li Zeng, LTE—A Research and Implementation of System Physical Downstream Control Channel, CNKI Excellent Master's Degree Thesis Full Text Library, Jun. 8, 2016, 100 pages.

Spreadtrum Communications, "On DL RS Multiplexing", R1-1715511, 3GPP TSG RAN WG1 Meeting NR#3, Sep. 18-21, 2017, 7 pages.

Chinese Office Action dated Sep. 15, 2022 issued in counterpart application No. 201880061437.2, 19 pages.

Korean Office Action dated Jul. 13, 2022 issued in counterpart application No. 10-2017-0121320, 9 pages.

Australian Examination Report dated Aug. 10, 2022 issued in counterpart application No. 2018334842, 3 pages.

NEC, "Discussion on DL Pre-emption Indication", R1-1715711, 3GPP TSG RAN WG1 Meeting NR#3, Sep. 18-21, 2017, 2 pages.

Vivo, "Multiplexing Data with Different Transmission Durations", R1-1715646, 3GPP TSG RAN WG1 Meeting NR#3, Jan. 18-21, 2017, 6 pages.

Korean Office Action dated Jan. 27, 2022 issued in counterpart application No. 10-2017-0121320, 11 pages.

Indian Search Report dated Mar. 23, 2022 issued in counterpart application No. 202037010276, 7 pages.

European Search Report dated Apr. 7, 2022 issued in counterpart application No. 21207783.8-1213, 10 pages.

KR Decision to Refuse dated Dec. 22, 2022 issued in counterpart application No. 10-2017-0121320, 5 pages.

* cited by examiner

METHOD AND APPARATUS FOR TRANSMITTING AND RECEIVING CONTROL INFORMATION IN WIRELESS COMMUNICATION SYSTEM

PRIORITY

This application is a Continuation of U.S. patent application Ser. No. 16/645,335, which was filed with the U.S. Patent and Trademark Office on Mar. 6, 2020, which is a National Phase Entry of PCT International Application No. PCT/KR2018/008627, filed on Jul. 30, 2018, and claims priority to Korean Patent Application No. 10-2017-0121320, filed on Sep. 20, 2017, the entire content of each of which is incorporated herein by reference.

BACKGROUND

1. Field

The disclosure relates to a wireless communication system, and in detail, a method and apparatus for smoothly providing services in a communication system. More particularly, the disclosure relates to a method of transmitting and receiving control information in a communication system.

2. Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems.

The aim of the 5G communication system is to improve not only a data rate but also system performance in various aspects including assurance of broader coverage, data transmission and reception with ultra low latency, and the like. The 5G communication system may classify types of services according to targeted system performances and provide the services so as to further effectively improve system performance. Accordingly, different types of services may coexist in the 5G communication system.

Disclosed embodiments relate to a method and apparatus for transmitting and receiving control information, whereby a communication system where different types of services coexist can effectively provide a plurality of services to a radio resource domain allocated to a terminal.

SUMMARY

According to an embodiment of the disclosure, provided is a method performed by a user equipment (UE) in a wireless communication system, with the method including obtaining a Radio Network Temporary Identifier (RNTI) for monitoring a physical downlink control channel (PDCCH) conveying downlink control information (DCI) including pre-emption indication information; performing monitoring on the PDCCH conveying the DCI including the pre-emption indication information based on the RNTI; and when the DCI including the pre-emption indication information is detected, determining that no transmission for the terminal is present in a physical resource block (PRB) and a first symbol from a set of PRBs and a set of symbols, with the PRB and the first symbol being indicated by the DCI, with the DCI including the pre-emption indication information being not applied to reception of a synchronization signal (SS) and a physical broadcast channel (PBCH) block, and with a second symbol indicated as an uplink being excluded from symbols indicated by the DCI.

According to a further embodiment of the disclosure, provided is a method performed by a base station (BS) in a wireless communication system, the method including providing, to a user equipment (UE), a Radio Network Temporary Identifier (RNTI) for monitoring a physical downlink control channel (PDCCH) conveying downlink control information (DCI) including pre-emption indication information; and transmitting, to the UE, the DCI including pre-emption indication information via PDCCH, with a physical resource block (PRB) and a first symbol, which are indicated by the DCI comprising the pre-emption indicator, from a set of PRBs and a set of symbols are configured not to allow transmission for the UE, with the DCI including the pre-emption indication information not being applied to reception of a synchronization signal (SS) and a physical broadcast channel (PBCH) block, and with a second symbol indicated as an uplink being excluded from symbols indicated by the DCI.

According to another embodiment of the disclosure, provided is a user equipment (UE) in a wireless communication system, the UE including a transceiver and at least one processor configured to obtain a Radio Network Temporary Identifier (RNTI) for monitoring a physical downlink control channel (PDCCH) conveying downlink control information (DCI) including pre-emption indication information, perform monitoring on the PDCCH conveying the DCI including the pre-emption indication information based on the RNTI, and when the DCI including the pre-emption indication information is detected, determine that no transmission for the terminal is present in a physical resource block (PRB) and a first symbol from a set of PRBs and a set of symbols based on the pre-emption indication information, with the DCI including the pre-emption indication information not being applied to reception of a synchronization signal (SS) and a physical broadcast channel (PBCH) block, and with a second symbol indicated as an uplink being excluded from symbols indicated by the DCI.

According to yet another embodiment of the disclosure, provided is a base station (BS) in a wireless communication system, the BS including a transceiver and at least one processor configured to provide, to a user equipment (UE), a Radio Network Temporary Identifier (RNTI) for monitoring a physical downlink control channel (PDCCH) conveying downlink control information (DCI) including pre-emption indication information, and transmit, to the LE, the DCI including pre-emption indication information via PDCCH, with a physical resource block (PRB) and a first symbol which are indicated by the DCI comprising the pre-emption indicator from a set of PRBs and a set of symbols are configured not to allow transmission for the UE, with the DCI including the pre-emption indication information not being applied to reception of a synchronization signal (SS) and a physical broadcast channel (PBCH) block, and with a second symbol indicated as an uplink being excluded from symbols indicated by the DCI.

According to disclosed embodiments, information about an interruption occurring when different types of services coexist in a communication system is provided via control information, whereby data may be effectively transmitted by using the different types of services. Also, according to disclosed embodiments, provided is a method by which data transmission between different types of services having different characteristics may coexist by transmitting and receiving control information, whereby requirements of each system may be fulfilled, and at least one of a frequency-time resource and a space resource may be efficiently used.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
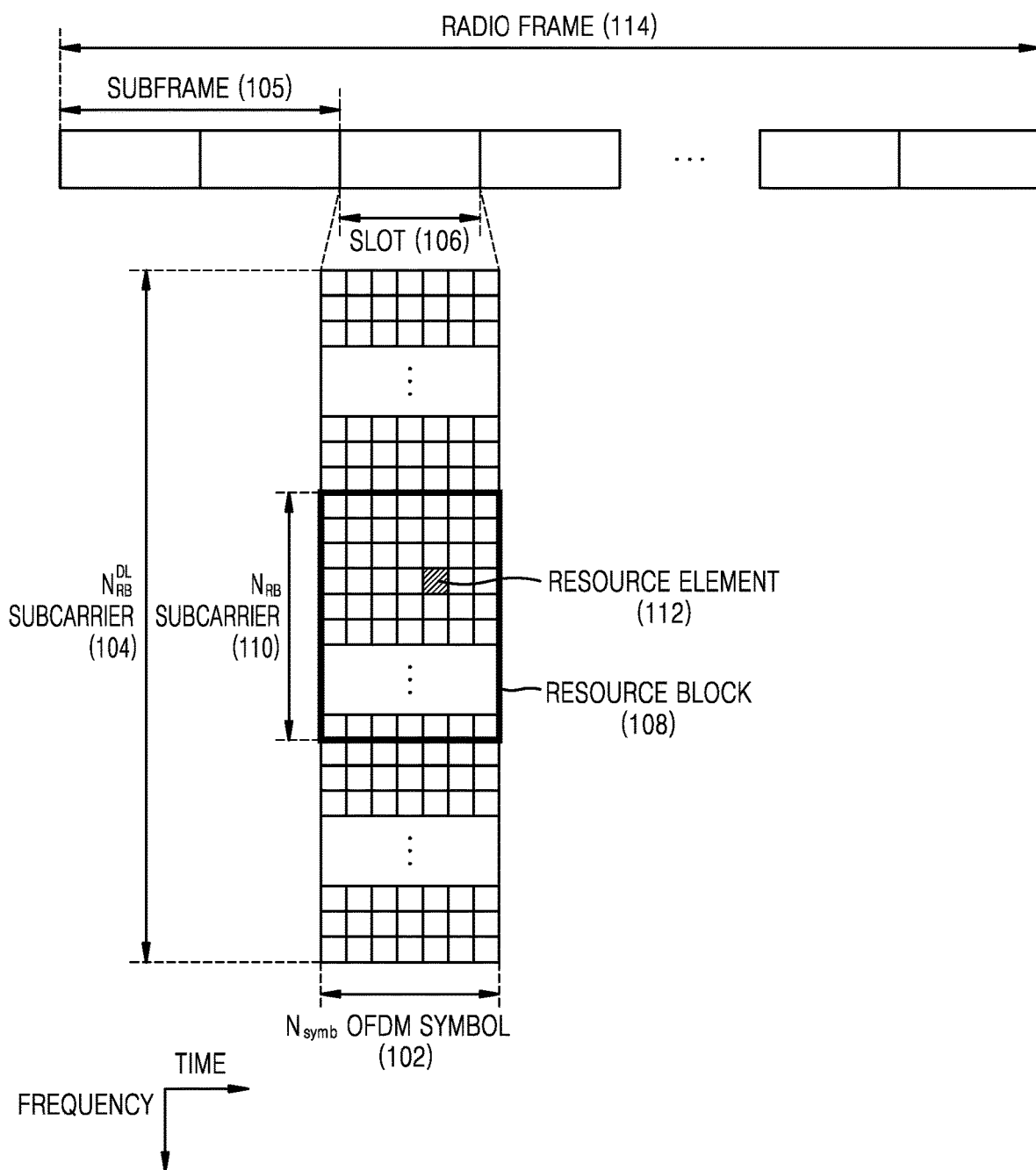
FIG. 1 illustrates a basic structure of a time-frequency domain that is a radio resource domain in which data or a control channel is transmitted in a downlink (DL) in a long term evolution (LTE) system or a system similar thereto.

Hereinafter, embodiments of the disclosure will be described in detail with reference to the attached drawings.

When describing the embodiments, descriptions about technologies that are well known in the art to which the disclosure belongs and are not directly related to the disclosure are not provided here. By not providing unnecessary descriptions, the concept of the disclosure can be further clearly provided without obscuring it.

For the same reasons, in the attached drawings, some elements may be exaggerated, omitted, or roughly illustrated. Also, the size of each element does not exactly correspond to an actual size of each element. Like reference numerals in the drawings denote like or corresponding elements.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Throughout the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card.

Also, a "unit" may include one or more processors in an embodiment of the disclosure.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-Advanced (LTE-A), and LTE-Pro of the 3GPP, high rate packet data (HRPD) and ultra mobile broadband (UMB) of 3GPP2, 802.16e of the Institute of Electrical and Electronic Engineers (IEEE), or the like. As a $5^{th}$ generation (5G) wireless communication system, 5G or new radio (NR) communication standards are being established.

In order to achieve a high data transmission rate, 5G communication systems are designed to be implemented in a super-high frequency band (millimeter wave (mmWave)), e.g., a frequency band of 60) GHz. In order to reduce the occurrence of stray electric waves and to increase transmission distances of electric waves in the super-high frequency band, various technologies for 5G communication systems are being studied, for example: beamforming, Massive Multiple Input Multiple Output (MIMO), Full Dimensional MIMO (FD-MIMO), array antennas, analog beamforming, and large-scale antennas. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In a 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (ME) technology has emerged, in which the IoT technology is combined with, for example, technology for processing big data through connection with a cloud server. To implement the various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication systems such as sensor networks, machine-to-machine (M2M) communication, machine-type communication (MTC), or the like are implemented by using techniques including beamforming, multiple-input and multiple-output (MIMO), array antennas, or the like. Application of cloud radio access network (Cloud-RAN) as the above-described big data processing technology may be an example of convergence of 5G communication technology and IoT technology.

In the aforementioned wireless communication system including 5G, at least one of services including enhanced Mobile BroadBand (eMBB), massive Machine Type Communications (mMTC), and Ultra-Reliable and Low-Latency Communications (URLLC) may be provided to a terminal. The services may be provided to a same LIE or different UEs during a same time period. In embodiments, the eMBB service may be for high-speed transmission of high-volume data, the mMTC service may be for minimization of power of the terminal and accesses by multiple terminals, and the URLLC service may be for high reliability and low latency, but the disclosure is not limited thereto. The services may be primary services in a system such as am LTE system or a 5G or new radio/next radio (NR) system after the LTE system. With embodiments, a method and apparatus for coexistence of eMBB and URLLC or coexistence of mMTC and URLLC will be described below.

In a case where a BS scheduled data corresponding to an eMBB service to a certain UE in a transmission time interval (TTI), when there occurs a situation in which URLLC data has to be transmitted in the TTI, the BS may not transmit a part of eMBB data in a frequency band where the eMBB data is already scheduled and thus is transmitted but may transmit the occurred URLLC data in the frequency band. A UE for which eMBB is scheduled and a UE for which URLLC is scheduled may be same UE or different UES. In this case, a part of the eMBB data that is already scheduled and thus is transmitted occurs, the part not being transmitted, such that a probability that the eMBB data may be corrupted is increased. Accordingly, there is a need to define a method of processing signals received by the UE for which eMBB is scheduled and the UE for which URLLC is scheduled, and a method of receiving the signals. Therefore, with embodiments, a method of coexisting between different types of services so as to transmit information according to each service when a plurality of pieces of information according to eMBB and URLLC are simultaneously scheduled, a plurality of pieces of information according to mMTC and URLLC are simultaneously scheduled, a plurality of pieces of information according to mMTC and eMBB are simultaneously scheduled, or a plurality of pieces of information according to eMBB, mMTC and OMB are simultaneously scheduled, by sharing a part or entire frequency bandwidth, will be described below.

However, mMTC, URLLC, and eMBB described above are only examples of different service types, and thus service types to which embodiments of the disclosure are applied are not limited thereto.

Hereinafter, embodiments of the disclosure will now be described more fully with reference to the accompanying drawings. In the following description, well-known functions or constructions are not described in detail because they would obscure the concept of the disclosure with unnecessary detail. The terms used below are defined considering functions used in the disclosure, and may be changed according to the intent or known methods of operators and users. Accordingly, definitions of the terms should be understood based on the entire description of the present specification. In the following description, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. In the disclosure, a downlink (DL) refers to a wireless transmission path of a signal to be transmitted from a BS to a UE, and an uplink (UL) refers to a wireless transmission path of a signal to be transmitted from a UE to a BS. Although embodiments of the disclosure are described below by using LTE or LTE-A systems as an example, the embodiments of the disclosure are also applicable to other communication systems having similar technical backgrounds or channel structure. For example, 5G NR mobile communication technology developed after LTE-A may belong thereto. Also, the embodiments of the disclosure are applicable to other communication systems through modification at the discretion of one of ordinary skill in the art without greatly departing from the scope of the disclosure.

As a representative example of the broadband wireless communication system, the LTE system has adopted an orthogonal frequency division multiplexing (OFDM) scheme in a DL and has adopted a single carrier frequency division multiple access (SC-FDMA) scheme in an UL. The UL refers to a radio link through which a UE (also referred to as a terminal) or an MS transmits data or a control signal to a BS (e.g., eNB), and the refers to a radio link through which a BS transmits data or a control signal to a UE. The above-described multiple access scheme separates data or control information for each user by allocating and operating time-frequency resources on which the data or the control information is carried for each user, so that the time-frequency resources do not overlap each other, that is, so that orthogonality is realized.

The LTE system employs a hybrid automatic repeat request (HARQ) scheme that retransmits data in a physical layer when decryption fails in initial transmission of the data. HARQ refers to a scheme in which when a receiver fails to accurately decrypt (decode) data, the receiver transmits information indicating a decoding failure, i.e., a negative acknowledgement (NACK), to a transmitter to allow the transmitter to retransmit the data in the physical layer. The receiver improves data reception performance by combining the data retransmitted by the transmitter with data that fails to be decoded previously. When accurately decoding the data, the receiver transmits information indicating a decoding success, i.e, an acknowledgement (ACK), to the transmitter to allow the transmitter to transmit new data.

FIG. 1 illustrates a basic structure of a time-frequency domain that is a radio resource domain in which data or a control channel is transmitted in a downlink (DL) in an LTE system or a system similar thereto.

Referring to FIG. 1, a horizontal axis of the radio resource domain represents a time domain and a vertical axis represents a frequency domain. A minimum transmission unit in the time domain may be an OFDM symbol, in which $N_{symb}$ OFDM symbols 102 are gathered to constitute one slot 106, and two slots are gathered to constitute one subframe 105. The length of the slot is 0.5 ms, and the length of the subframe is 1.0 ms. Also, a radio frame 114 is a time domain period including 10 subframes. A minimum transmission unit in the frequency domain is a subcarrier, and the transmission bandwidth of the whole system transmission bandwidth may include $N_{DL}^{RB}$ subcarriers 104 in total. However, such numerical values may be variably applied.

A basic unit of a resource in the time-frequency domain is a resource element (RE) 112 and may be expressed as an OFDM symbol index and a subcarrier index. A resource block (RB) 108 or a physical resource block (PRB) may be defined as $N_{symb}$ successive OFDM symbols 102 in the time domain and $N_{RB}$ successive subcarriers 104 in the frequency domain. One RB 108 in one slot may include $N_{symb} \times N_{RB}$ REs 112. In general, a minimum allocation unit of data in the frequency domain is the RB, and in the LTE system, $N_{symb}=7$ and $N_{RB}=12$, and $N_{BW}$ and $N_{RB}$ may be proportional to a bandwidth of a system transmission band. A data rate may increase in proportion to the number of RBs scheduled to a UE.

The UE system may define and operate 6 transmission bands. In a frequency division duplexing (FDD) system in which the DL and the UL are discriminated by frequencies and operated, the DL transmission bandwidth and the UL transmission bandwidth may differ from each other. The channel bandwidth indicates a radio frequency (RF) bandwidth that corresponds to a system transmission bandwidth. Table 1 below indicates a corresponding relationship, defined in the LTE system, between the system transmission bandwidth and the channel bandwidth. For example, the LTE system having a channel bandwidth of 10 MHz may have a transmission bandwidth composed of 50 RBs.

TABLE 1

Corresponding relationship between system transmission bandwidth and channel bandwidth

| Channel bandwidth $BW_{Channel}$ [MHz] | .4 | | 0 | 5 | 20 |
|---|---|---|---|---|---|
| Transmission bandwidth configuration $N_{RB}$ | 5 | 5 | 0 | 5 | 100 |

Downlink control information (DCI) may be transmitted within initial N OFDM symbols in the subframe. In an embodiment, N={1, 2, 3} in general. Therefore, based on the amount of control information to be transmitted in a current subframe, the N value may be variably applied to each subframe. The control information to be transmitted may include a control channel transmission period indicator indicating the number of OFDM symbols through which the control information is to be transmitted, scheduling information about DL data or UL data, and information about HARQ ACK/NACK.

In the LTE system, scheduling information about DL data or UL data may be delivered from the base station to the UE through downlink control information (DCI). The DCI may be defined according to various formats, and according to each format, whether the DCI is scheduling information (UL grant) about UL data, is scheduling information (DL grant) about DL data, or is compact DCI having small-size control information, applies spatial multiplexing using multiple antennas, and is DCI for power control. For example, DCI format 1, which is scheduling control information (DL grant) about DL data, may include at least one of a plurality of pieces of following control information.

Resource allocation type 0/1 flag: indicates whether a resource allocation type is Type 0 or Type 1. For Type 0, a resource is allocated in a unit of a resource block group (RBG) by applying a bitmap scheme thereto. In the LTE system, a basic unit of scheduling is a RB expressed in time and frequency domain resources, and a RBG composed of a plurality of RBs is a basic unit of scheduling for Type 0. Type 1 allows a particular RB in the RBG to be allocated.

Resource block assignment: indicates a RB allocated to data transmission. Representation of a resource is determined according to a system bandwidth and a resource allocation scheme.

Modulation and coding scheme (MCS): indicates a modulation scheme used in data transmission and a size of a transport block (TB) that is data to be transmitted.

HARQ process number: indicates a process number of HARQ.

New data indicator: indicates whether first transmission or re-transmission of HARQ.

Redundancy version: indicates a redundancy version of HARQ,

Transmit power control (TPC) command for physical uplink control channel (PUCCH): indicates a TPC command with respect to a PUCCH that is UL control channel.

The DCI may be transmitted via a Physical Downlink Control Channel (PDCCH) (or control information, hereinafter, interchangeably used) that is a DL physical control channel or an Enhanced PDCCH (EPDCCH) (or enhanced control information, hereinafter, interchangeably used) after passing through a channel coding and modulation process.

In general, the DCI is scrambled by a Specific Radio Network Temporary Identifier (RNTI) or UE identifier (C-RNTI) independently with respect to each UE, is added with a Cyclic Redundancy Check (CRC), is channel-coded, and then is configured as an independent PDCCH to be transmitted. In the time domain, the PDCCH is mapped and transmitted for the control channel transmission period A mapping location of the PDCCH in the frequency domain may be determined by an identifier (ID) of each UE, and the PDCCH may be transmitted through a whole system transmission bandwidth.

The DL data may be transmitted through a Physical Downlink Shared Channel (PDSCH) that is a physical channel for transmitting the DL data. The PDSCH may be transmitted after the control channel transmission period, and scheduling information, such as a specific mapping location or a modulation scheme in the frequency domain, may be determined based on the DCI to be transmitted via the PDCCH.

The BS may notify the UE of a modulation scheme applied to the PDSCH to be transmitted and a transport block size (TBS) to be transmitted, by using an MCS included in the control information constituting the DCI. In an embodiment, the MCS may be composed of 5 bits or may be composed of greater or smaller bits than 5 bits. The TBS corresponds to a size of the BS before channel coding for error correction is applied to the TB to be transmitted by the BS.

The modulation scheme supported in the LTE system is quadrature phase shift keying (QPSK), 16 quadrature amplitude modulation (16QAM), and 64QAM, and modulation orders $Q_m$ thereof correspond to 2, 4, and 6, respectively. That is, QPSK modulation may transmit 2 bits per symbol, 16QAM modulation may transmit 4 bits per symbol, and 64QAM modulation may transmit 6 bits per symbol. Also, modulation schemes higher than 256QAM may also be used based on system modification.

Figure 2:
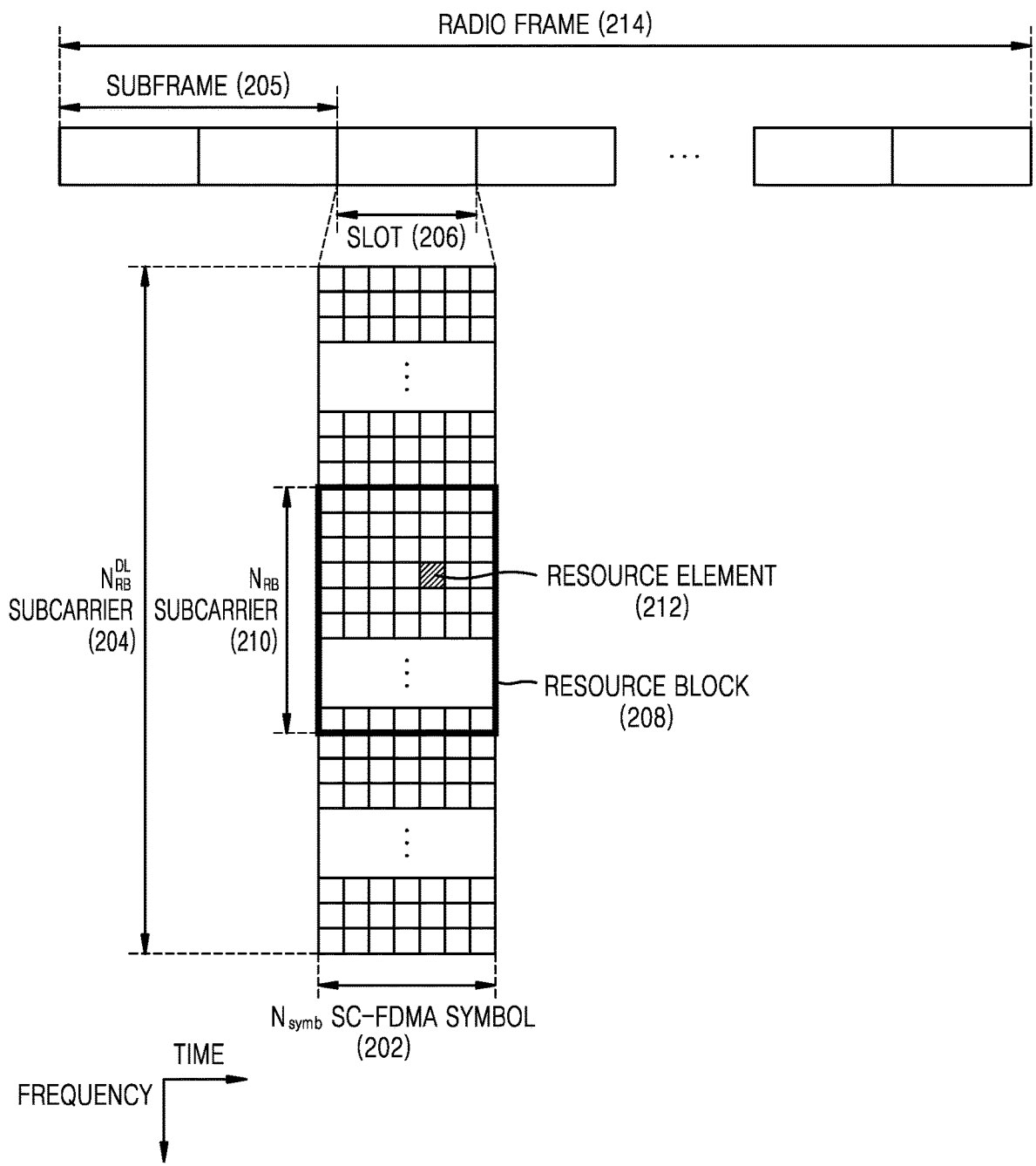
FIG. 2 illustrates a basic structure of a time-frequency domain that is a radio resource domain in which data or a control channel is transmitted in an uplink (UL) in an LTE-Advanced (LTE-A) system or a system similar thereto.

FIG. 2 illustrates a basic structure of a time-frequency domain that is a radio resource domain in which data or a control channel is transmitted in an UL in an LTE-A system or a system similar thereto.

Referring to FIG. 2, a horizontal axis of the radio resource domain represents a time domain and a vertical axis represents a frequency domain. A minimum transmission unit in the time domain may be an SC-FDMA symbol, in which $N_{symbUL}$ SC-FDMA symbols 202 are gathered to constitute one slot 206. Two slots are gathered to constitute one subframe 205. A minimum transmission unit in the frequency domain is a subcarrier, and the whole system transmission bandwidth may include $N_{DL}^{RB}$ subcarriers 204 in total. $N_{DL}^{RB}$ may have a value that is proportional to a system transmission bandwidth.

A basic unit of a resource in the time-frequency domain is a resource element (RE) 212 and may be defined as a SC-FDMA symbol index and a subcarrier index. A resource block pair (RB pair) 208 may be defined as $N_{symb}$ successive SC-FDMA symbols in the time domain and $N_{RB}$ successive subcarriers in the frequency domain. Therefore, one RB is composed of $N_{symb} \times N_{RB}$ REs. In general, a minimum transmission unit of data or control information is a RB unit. A PUCCH is mapped to a frequency domain corresponding to 1 RB and then is transmitted during 1 subframe.

In the LTE system, a timing relationship between a PDSCH that is a physical channel for data transmission and a PUCCH or a PUSCH which is a UL physical channel in which HARQ ACK/NACK corresponding to PDCCH/EPDDCH including semi-persistent scheduling release (SPS release) may be defined. For example, in the LTE system operating in frequency division duplex (FDD), a PDSCH transmitted in n-4$^{th}$ subframe or HARQ ACK/NACK corresponding to PDCCH/EPDCCH including SPS release may be transmitted to a PUCCH or a PUSCH in n$^{th}$ subframe.

In the LTE system, DL HARQ adapts an asynchronous HARQ scheme in which data re-transmission time is not fixed. That is, when the HARQ NACK is fed back from the UE with respect to the first-transmitted data transmitted by the BS, the BS may freely determine, through the scheduling operation, transmission time of data to be retransmitted. The UE may buffer data that is determined as an error as a result of decoding the received data for the HARQ operation, and then may combine the buffered data with next data retransmitted from the BS.

When the UE receives, in subframe n, a PDSCH including DL data transmitted from the BS, the UE transmits, in subframe n+k, UL control information including HARQ ACK or NACK with respect to the DL data to the BS via a PITCH or a PUSCH. In this regard, the k may be differently defined according to FDD or time division duplex (TDD) and its subframe configuration of an LTE system. For example, in a case of a FDD LTE system, the k is fixed to 4. In a case of a TDD LTE system, the k may be changed according to subframe configuration and a subframe number. Also, when data is transmitted on a plurality of carriers, a value of k may be differently applied according to TDD configuration of each carrier.

In the LTE system, unlike DL HARQ, UL HARQ adapts a synchronous HARQ scheme in which data re-transmission time is fixed. That is, a UL/DL timing relationship among a Physical Uplink Shared Channel (PUSCH) that is a physical channel for transmission of UL data, a PDCCH that is a DL control channel preceding the PUSCH, and a Physical Hybrid Indicator Channel (PHICH) that is a physical channel for transmission of DL HARQ ACK/HACK, the PHICH corresponding to the PUSCH, may be transmitted and received according to rules below.

When the UE receives, in subframe n, a PDCCH including UL scheduling control information or a PHICH in which DL HARQ ACK/NACK is transmitted, which is transmitted from the BS, the UE transmits, in subframe n+k, UL data corresponding to the control information via a PUSCH. In this regard, the k may be differently defined according to FDD or TDD and its configuration of an LTE system. For example, in a case of a FDD LTE system, the k is fixed to 4. In a case of a TDD LTE system, the k may be changed according to subframe configuration and a subframe number. Also, when data is transmitted on a plurality of carriers, a value of k may be differently applied according to TDD configuration of each carrier.

When the UE receives, in subframe i, a PHICH including information related to DL HARQ ACK/HACK from the BS, the PHICH corresponds to a PUSCH transmitted from the UE in subframe i-k. In this regard, the k may be differently defined according to FDD or TDD and its configuration of an LTE system. For example, in a case of a FDD LTE system, the k is fixed to 4. In a case of a TDD LTE system, the k may be changed according to subframe configuration and a subframe number. Also, when data is transmitted on a plurality of carriers, a value of k may be differently applied according to TDD configuration of each carrier.

TABLE 2

| PDCCH and PDSCH configured by C-RNTI | | | |
|---|---|---|---|
| Transmission mode | DCI format | Search space | Transmission scheme of PDSCH corresponding to PDCCH |
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using single transmission layer |
| Mode 7 | DCI format 1A | Common and UE specific by C-RNTI | When the number of PBCH antenna ports is 1, single-antenna port, port 0 is used for another transmit diversity, or Transmit diversity |
|  | DCI format 1 | UE specific by C-RNTI | Single-antenna port, port 5 |

TABLE 2-continued

PDCCH and PDSCH configured by C-RNTI

| Transmission mode | DCI format | Search space | Transmission scheme of PDSCH corresponding to PDCCH |
|---|---|---|---|
| Mode 8 | DCI format 1A | Common and UE specific by C-RNTI | When the number of PBCH antenna ports is 1, single-antenna port, port 0 is used for another transmit diversity (see otherwise Transmit diversity) |
| | DCI format 2B | UE specific by C-RNTI | Double-layer transmission, port 7 and port 8 or single antenna port, port 4 or 8 |

Table 2 above shows DCI format types that are supportable according to respective transmission modes based on conditions configured by C-RNTI defined in 3GPP TS 36.213. The UE assumes existence of corresponding DCI in a control area period according to a preset transmission mode, and performs searching and decoding. For example, when the UE is configured with transmission mode 8, the UE searches for DCI format 1A in a common search space and an UE-specific search space, and searches for DCI format 2B only in the UE-specific search space.

Descriptions about the wireless communication system are given above with reference to the LTE system, and the disclosure is not limited to the LTE system and thus may be applied to various wireless communication systems including NR, 5G, or the like. Also, when an embodiment is applied to a different wireless communication system, a k value may also be changed and then applied to a system using a modulation scheme corresponding to FDD.

Figure 3:
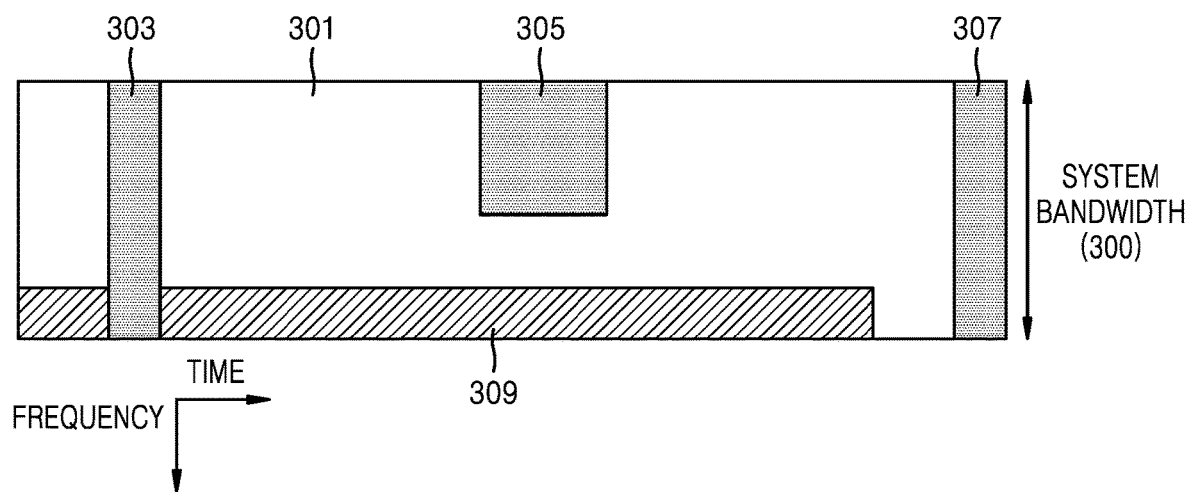
FIGS. 3 and 4 are drawings for describing a method by which first-type data, second-type data, and third-type data, which are services considered in a $5^{th}$ generation (5G) or new radio (NR) system, are allocated in time-frequency resources.
Figure 4:
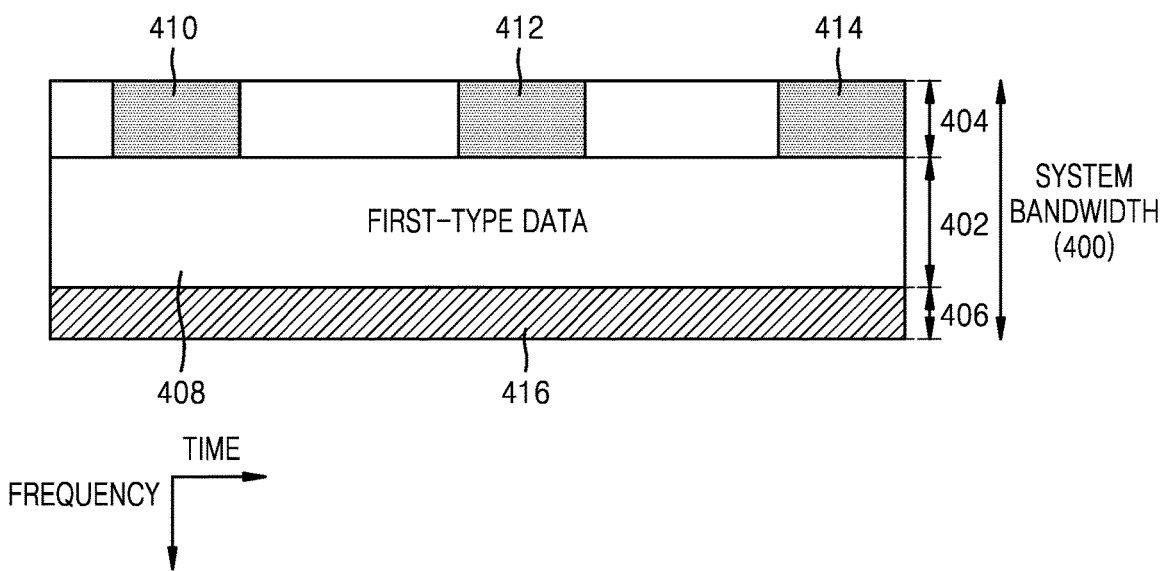

FIGS. 3 and 4 are drawings for describing a method by which first-type data, second-type data, and third-type data, which are services considered in a 5G or NR system, are allocated in time-frequency resources.

Referring to FIGS. 3 and 4, each system may check a scheme by which frequency and time resources are allocated for transmission of information.

First, referring to FIG. 3, first-type data 301, a plurality of pieces of second-type data 303, 305 and 307, and third-type data 309 may be allocated to an entire system frequency bandwidth 300. When the plurality of pieces of second-type data 303, 305 and 307 are generated and thus are required to be transmitted while the first-type data 301 and the third-type data 309 are allocated to a particular frequency band and thus are transmitted, the 5G or NR system may leave parts to which the first-type data 301 and the third-type data 309 were already allocated empty or may stop transmission in the allocated parts, and may transmit the plurality of pieces of second-type data 303, 305 and 307. For example, when the plurality of pieces of second-type data 303, 305 and 307 correspond to services requesting reduction of a latency time from among a plurality of services, the plurality of pieces of second-type data 303, 305 and 307 may be allocated to a part of a resource to which the first-type data 301 is allocated and thus may be transmitted. When the plurality of pieces of second-type data 303, 305 and 307 are additionally allocated, for transmission, to the resource to which the first-type data 301 is allocated, the first-type data 301 may not be transmitted in overlapped frequency-time resources, such that transmission performance of the first-type data 301 may be decreased. That is, in the aforementioned case, due to allocation of the plurality of pieces of second-type data 303, 305 and 307, transmission failure of first-type data may occur.

In the disclosure, an example of the first-type data 301 may include eMBB, an example of the plurality of pieces of second-type data 303, 305 and 307 may include URLLC, and an example of the third-type data 309 may include mMTC, but data of each type is not limited to the examples.

Referring to FIG. 4, the 5G or NR system may use each of subbands 402, 404 and 406 divided from an entire system frequency bandwidth so as to transmit services and data. Information associated with configuration of the subbands may be predetermined, and according to an embodiment, the information may be transmitted from the BS to the UE via upper layer signaling. According to another embodiment, the BS or a network node may randomly split the information associated with configuration of the subbands and may provide services to the UE, without transmission of separate subband configuration information. In FIG. 4, it is assumed that the first subband 402 is used in transmitting first-type data, the second subband 404 is used in transmitting second-type data, and the third subband 406 is used in transmitting third-type data.

In all embodiments, a length of a transmission time interval (TTI) used in transmitting second-type data may be shorter than a length of a TTI used in transmitting first-type data or third-type data. A response to information associated with the second-type data may be transmitted faster than that of the first-type data or the third-type data, and accordingly, information may be transmitted and received with low latency.

A first-type data service to be described below is described as a first-type service, and data for the first-type service is described as first-type data. The first-type service is not limited to first-type data, and may correspond to a case in which high-speed data transmission is requested or wideband transmission is performed. Also, a second-type data service is described as a second-type service, and data for the second-type service is described as second-type data. The second-type service is not limited to second-type data, and may be applied to another system requesting a low latency time or transmission with high reliability, or requesting both a low latency time and transmission with high reliability. Also, a third-type data service is described as a third-type service, and data for the third-type service is described as third-type data. The third-type service is not limited to third-type data, and may correspond to a case in which low speed, wider coverage, or low power is requested. When an embodiment is described, it is assumed that the first-type service includes or does not include the third-type service. An example of the first-type data may include OMB, an example of the second-type data may include URLLC, and an example of the third-type data may include mMTC.

Structures of physical layer channels used by respective types to transmit the aforementioned three services or data may differ. For example, at least one of a length of a TTI, an allocation unit of a frequency resource, a structure of a control channel, and a data mapping method may differ.

The descriptions are provided above with reference to three services and three types of data, but services with more types and data corresponding thereto may exist, and embodiments of the disclosure may also be applied thereto.

To describe a method and apparatus proposed in the present embodiment, terms of a physical channel and a signal in an LTE or LTE-A system according to the related art may be used. However, embodiments of the disclosure may be applied not only to the LTE and LTE-A systems but also applied to a wireless communication system. According to another embodiment, contents of the disclosure may be applied to the 5G or NR system.

The disclosure, as described above, defines transmission and reception operations of the UE and BS for transmission of the first-type service, the second-type service, the third-type service, or data, and proposes a method of operating UEs together in a same system, the UEs being scheduled for different types of services or data. In the disclosure, a first-type UE, a second-type UE, and a third-type UE respectively indicate UEs that are scheduled for first-type, second-type, and third-type services or data. In embodiments, the first-type UE, the second-type LTE, and the third-type UE may be a same LIE or respectively different UEs.

In embodiments below, from among signals transmitted from the BS to the UE, a signal requesting a response from the UE may be a first signal, and a response signal of the which corresponds to the first signal may be a second signal. For example, at least one of an UL scheduling grant signal and a DL data signal may be described as the first signal. Also, at least one of a UL data signal with respect to UL scheduling grant, and HARQ ACK/NACK with respect to the DL data signal may be described as the second signal. In embodiments, a service type of the first signal may be at least one of the first-type data, the second-type data, and the third-type data, and a service type of the second signal may correspond to at least one of the aforementioned service types.

The contents of the disclosure may be applied to FDD and TDD systems. Hereinafter, upper layer signaling in the disclosure indicates a method by which the BS transmits a signal to the UE by using a DL data channel of a physical layer or the UE transmits a signal to the BS by using a UL data channel of a physical layer, and may be referred to as radio resource control (RRC) signaling, packet data convergence protocol (PDCP) signaling, or a medium access control element (MAC CE).

In the disclosure, the UE in a DL channel may be described as a receiver, and the BS may be described as a transmitter. Also, the UE in a UL channel may be described as a transmitter, and the BS may be described as a receiver.

A DL control channel described in the disclosure may be one of, but is not limited to, a cells-common DL control channel, a UEs-common DL control channel, or a UE-specific control channel.

DCI described in the disclosure may be one of, but is not limited to, cells-common DCI, UEs-common DCI, or UE-specific control information.

Upper signaling described in the disclosure may be one of, but is not limited to, cells-common upper signaling or VE-specific upper signaling.

In the disclosure, a method described with reference to control, data information, and a channel in a DL may be sufficiently applicable to control, data information, and a channel in a UL.

Figure 5:
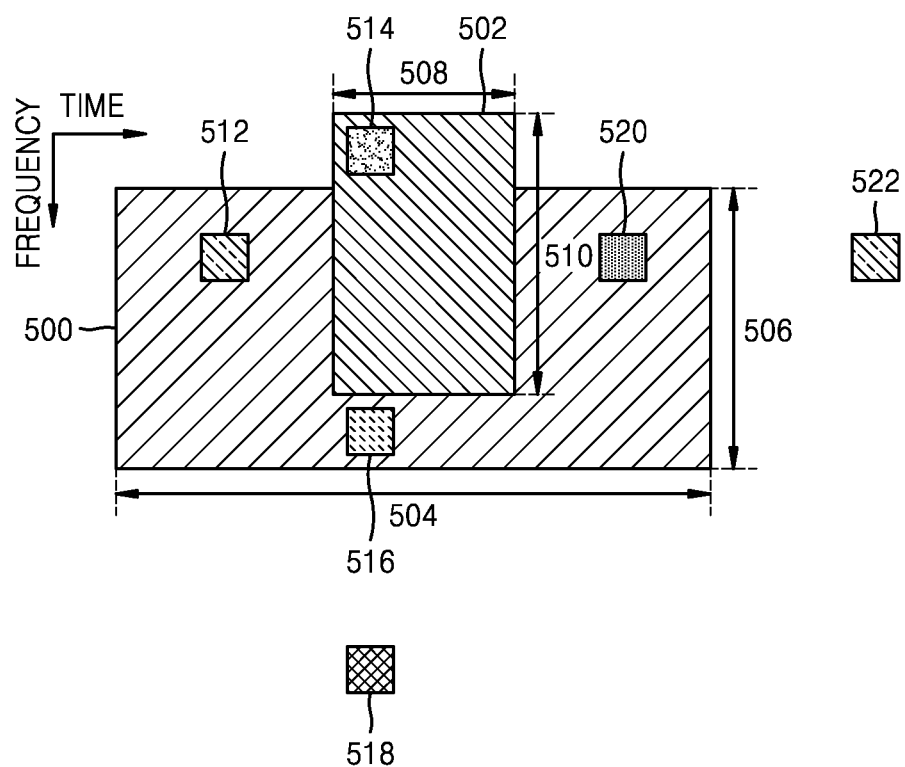
FIG. 5 is a diagram illustrating an indication method using downlink control information (DCI) when an interruption occurs to data of a particular service in a wireless communication system, according to an embodiment.

FIG. 5 is a diagram illustrating an indication method using DCI when an interruption occurs to data of a particular service in a wireless communication system, according to an embodiment.

Referring to FIG. 5, a BS may transmit first-type data 500 to a UE for a first-type service via a physical DL data channel. A time period 504 to which the first-type data 500 is allocated may be determined based on a unit for transmitting the first-type data 500, and the unit may be a slot composed of 7 (or 14) OFDM symbols, may be composed of one or more OFDM symbols, or may be composed of one or more slots. In the time period 504 to which the first-type data 500 is allocated, the first-type data 500 may be successively allocated as shown in FIG. 5 or may be non-successively allocated unlike that shown in FIG. 5, and a frequency period 506 to which the first-type data 500 is allocated may be equal to or smaller than a maximum frequency bandwidth supportable by the UE or a maximum system frequency bandwidth. In the frequency period 506 to which the first-type data 500 is allocated, the first-type data 500 may be successively allocated as shown in FIG. 5 or may be non-successively allocated unlike to that shown in FIG. 5.

In the disclosure, the first-type data 500 may be a reference signal (RS) such as a Channel State Information Reference Signal (CSI-RS) used for channel estimation. Alternatively, a resource to which first-type data is allocated may be understood as a resource allocated for channel measurement. Alternatively, the first-type data may include DL data and a RS transmitted for DL channel measurement.

The BS may allocate second-type data 502 to all or some time resources and frequency resources from among time and frequency domains to which the pre-scheduled first-type data 500 is allocated. Such an operation may be described as one of puncturing, corruption, preemption, and interruption, and in the disclosure, for convenience of description, the operation will now be described as interruption.

According to another embodiment, the BS may allocate the second-type data 502, avoiding the time and frequency resources to which the pre-scheduled first-type data 500 is allocated. According to another embodiment, the BS may allocate the second-type data 502 to all or some time resources and frequency resources from among the time and frequency domains to which two or more pieces of the pre-scheduled first-type data 500 are allocated.

A time period 508 to which the second-type data 502 is allocated may be determined based on a unit for transmitting second-type data, and the unit may be a slot composed of 7 (or 14) OFDM symbols, may be composed of one or more OFDM symbols, or may be composed of one or more slots. In this regard, subcarrier spacing used for the first-type data 500 may be equal to or different from subcarrier spacing used for the second-type data 502. The time period 508 to which the second-type data 502 is allocated may be successively allocated as shown in FIG. 5 or may be non-successively allocated unlike to that shown in FIG. 5. A frequency period 510 to which the second-type data 502 is allocated may be equal to or smaller than a maximum frequency bandwidth supportable by the UE or a maximum system frequency bandwidth. The frequency period 510 to which the second-type data 502 is allocated may be successively allocated as shown in FIG. 5 or may be non-successively allocated unlike to that shown in FIG. 5.

The operation by which the interruption occurs will now be described with reference to FIG. 5. The time period 508 that is allocated in terms of time for the second-type data 502 may completely or partly overlap with the time period 504 allocated for the first-type data 500, and the frequency period 510 that is allocated in terms of frequency for the second-type data 502 may completely or partly overlap with the frequency period 506 allocated for the first-type data 500. When there occurs a period in which both the time period and the frequency period overlap, this may be determined as an operation by which the second-type data 502 interrupts all or some parts of the first-type data 500.

In a case where the interruption occurs, when a UE supporting the first-type service receives the first-type data 500, and does not have a separate indicator indicating whether the interruption is to occur, the UE may attempt to receive and demodulate and/or decode first-type data including a signal that is not data of the UE, such that a probability that demodulation and/or decoding fails may increase due to the interruption. Also, in a case where the first-type data 500 is retransmitted, when a separate indicator indicating whether the interruption is to occur does not exist, it is highly likely that the UE may perform HARQ combining on a received signal and the signal that is not the data of the UE, such that a probability that demodulation and decoding fails even in retransmission may increase. Therefore, to efficiently transmit the first-type data, it is necessary to inform the UE supporting the first-type service about whether interruption is to occur or not, by using separate indicator information. In the disclosure, an indicator may be used as terms including a second-type data generation indicator, an interruption indicator, a corruption indicator, a preemption indicator, a puncturing indicator, a UE buffer management indicator, a UE data management indicator, a UE HARQ buffer combining indicator, a UE re-decoding indicator, or the like, but hereinafter, for convenience of description, the indicator will now be described as the interruption indicator.

In the disclosure, a condition by which the UE searches for DCI including the interruption indicator in a valid transmission period may be one of conditions listed below.
- When the UE fails to demodulate and/or decode DL data
- When the UE receives scheduling of DL data via DCI
- When the UE receives indication for measurement of a DL reference signal (e.g., a Channel State Information Reference Signal (CSI-RS), a Phase Tracking Reference Signal (PTRS), or the like) via DCI, or is configured with measurement of the DL reference signal via upper signaling
- When the UE receives scheduling of a physical DL data channel resource domain
- When the UE is allocated with the physical DL data channel resource domain The UE supporting the first-type service may check, via an interruption indicator, a frequency resource or a time resource in which second-type data is generated. The frequency resource or the time resource, which is indicated by the interruption indicator, may be equal to or larger than a frequency resource or a time resource to which second-type data is allocated.

The interruption indicator according to an embodiment may provide information about the frequency resource in which the second-type data is generated, by completely applying or changing and then applying a method of allocating a bitmap or a LTE frequency resource in a PRB unit or a PRB group unit. According to another embodiment, the interruption indicator may provide the information about the frequency resource in which the second-type data is generated, via an offset compared to a frequency bandwidth (or a primary frequency) in which a primary synchronization signal (PSS), a secondary synchronization signal (SSS), a physical broadcast channel (PBCH), or the like which are necessary for cell initial access are transmitted.

Also, the interruption indicator according to an embodiment may provide information about the time resource in which the second-type data is generated, by using a value indicating a slot that is before (or after) a time point at which the interruption indicator is transmitted. According to another embodiment, the interruption indicator may provide the information about the time resource in which the second-type data is generated, by using a different value, a symbol range within a predetermined slot, or a symbol value.

Information included in the interruption indicator may correspond to at least one or a combination of the following.
- All or some parts of a physical DL data channel resource domain (configured with time or frequency resource) that is pre-received by the UE
- All or some parts of a physical DL data channel resource domain (configured with time or frequency resource) that is being received by the UE
- All or some parts of a physical DL data channel resource domain (configured with time or frequency resource) that is to be received by the UE
- System Frame Number (SFN)
- SFN and symbol (or symbol group) numbers (or indexes)
- SFN and symbol (or symbol group) numbers (or indexes), and sub-frequency bandwidth (this may be interchangeably used with a sub-frequency band or a sub-band)
- Value (or index) of a valid transmission period that is before (or after) a transmission period in which the interruption indicator is transmitted
- Value (or index) and symbol (or symbol group) number (or index) and sub-frequency bandwidth of a valid transmission period that is before (or after) a transmission period in which the interruption indicator is transmitted
- Symbol (or symbol group) number (or index) of a valid transmission period
- Sub-frequency bandwidth of a valid transmission period
- Partial time period of a transmission period, the partial time period being indicative by the interruption indicator
- Detailed time period information in the partial time period
- Partial frequency bandwidth of a transmission frequency bandwidth, the partial frequency bandwidth being indicative by the interruption indicator
- Detailed frequency bandwidth information in the partial frequency bandwidth
- Partial subband of carrier frequency bandwidth
- Sub-frequency bandwidth of frequency bandwidth which is supported by the second-type service
- Offset value (configured with one or two values) based on primary frequency on which a sync signal (SS) is transmitted
- Offset value configured with one or two values) based on a particular frequency reference value
- Particular resource domain including a particular time period and a particular frequency band Frequency resource information or time resource information included in the interruption indicator may be always defined in the standard as one or a combination of the aforementioned examples, may be configured, via upper signaling such as RRC, MAC CE, etc., with which type of information among the aforementioned examples is to be used, or may be configured, via L1 signaling (physical layer signaling), with which type of information among the aforementioned examples is to be used.

Subcarrier spacing applied to a time resource or a frequency resource which is indicated by the interruption indicator may correspond to one particular value. According to another embodiment, subcarrier spacing applied to the time resource or the frequency resource which is indicated by the interruption indicator may correspond to subcarrier spacing of first-type data that is received or is being received by the UE. When the subcarrier spacing of the first-type data that is received or is being received by the UE is different from the subcarrier spacing applied to a resource indicated by the interruption indicator, the UE may apply the frequency or time resource based on the subcarrier spacing applied to the resource indicated by the interruption indicator to the frequency or time resource based on the subcarrier spacing applied to a resource to which the first-type data is allocated, and thus may determine that all or some pails of a resource domain allocated to the first-type data is interrupted.

For example, when the UE that has received data in subcarrier spacing of 15 kHz receives an interruption indicator indicating a resource based on subcarrier spacing of 30 kHz, the UE may interpret and apply the resource based on subcarrier spacing of 15 kHz, the resource being indicated by the interruption indicator.

When the subcarrier spacing applied to the second-type data is different from the subcarrier spacing applied to the first-type data, the BS may configure a resource and a time unit of a resource indicated by the interruption indicator, based on the subcarrier spacing applied to the first-type data, and may provide the interruption indicator to the UE supporting the first-type service. As another example, the BS may configure the resource and the time unit of the resource indicated by the interruption indicator, based on the subcarrier spacing applied to the second-type data, and may provide the interruption indicator to the UE supporting the first-type service. In this regard, the UE supporting the first-type service may recognize that subcarrier spacing applied to the resource indicated by the interruption indicator is different from subcarrier spacing applied to the first-type data received or being received by the UE, and may appropriately select and apply the subcarrier spacing thereto.

Subcarrier spacing applied to a frequency unit and the time unit of the resource indicated by the interruption indicator may be defined, in the standard, as one of particular subcarrier spacing, the subcarrier spacing applied to the first-type data, or the subcarrier spacing applied to the second-type data, may be configured with upper signaling such as RRC, MAC CE, or the like, or may be configured with L1 signaling.

A resource that is indicative by the interruption indicator may be configured via two steps or one step. An example of a method of configuring a resource via two steps may include first indicating a sub frequency or time resource domain among a frequency or time resource domain configured via upper signaling so as to allow the interruption indicator to indicate, and then indicating a particular frequency or time resource domain in detail among the corresponding frequency or time resource domain. Another example of a method of configuring a resource via one step may include indicating a particular frequency or time resource domain in detail among a frequency or time resource domain configured via upper signaling so as to allow the interruption indicator to indicate.

In the disclosure, a method of configuring the interruption indicator may be at least one of the following. For example, whether to use the interruption indicator, a purpose of the interruption indicator, information included in the interruption indicator or a physical control channel for transmitting the interruption indicator may be configured according to following methods.

common or UE-specific upper signaling
common or LE-specific L1 signaling
implicit indication associated with frequency bandwidth
implicit indication associated with subcarrier spacing
combination of the aforementioned methods When the interruption indicator is configured by at least one of the aforementioned methods, the UE may search for DCI including the interruption indicator in a physical DL control channel.

The interruption indicator may be included in the DCI or may be configured in the form of a particular preamble sequence. When the interruption indicator may be included in the DCI, the DCI may be at least one of cell-common DCI, UE-common DCI, and UE-specific DCI.

The cell-common DCI may be transmitted via a physical cell-common control channel, the UE-common DCI may be transmitted via a physical UE-common DL control channel, and the UE-specific DCI may be transmitted via a physical UE-specific DL control channel. Also, the DCI including the interruption indicator may be combined with another DCI and thus may be configured as one DCI, or may be configured as separate independent DCI.

To transmit an interruption indicator, the BS may scramble a separate RNTI value for the interruption indicator with a CRC included in DCI including the interruption indicator and then may transmit the scrambled RNTI to a particular UE or a common UE. The UE may be pre-configured with the RNTI value for the interruption indicator via UE-common or UE-specific upper signaling, or may perform blind decoding on a pre-defined RNTI value in the standard, and when a CRC included in detected control information successfully performs descrambling with the RNTI, the UE may determine that the control information includes the interruption indicator.

As another example, the interruption indicator may be transmitted in a DL control channel similar to a Physical Control Format Indicator Channel (PCFICH) or a PHICH of the LTE according to the related art. DCI in which the interruption indicator is transmitted may be transmitted via a physical DL control channel pre-configured via upper signaling. In a case where the interruption indicator exists in a sequence form, the UE may determine whether or not an interruption is to occur, by checking whether a particular preamble sequence is detected. Also, information of the sequence configured as the interruption indicator may include frequency and time information.

When the UE receives, via a DL control channel, DCI (UE-common or UE-specific) scrambled with a particular UE identifier (e.g., RNTI) associated with the interruption indicator, the UE may determine that the control information includes the interruption indicator.

The UE according to an embodiment may or may not search for DCI including an interruption indicator, according to upper signaling (group-common or UE-specific) or L1 signaling (group-common or UE-specific). Also, the UE may or may not search for DCI including an interruption indicator, according to a frequency bandwidth. Also, the LTE may or may not search for DCI including an interruption indicator, in a particular time (e.g., a particular slot number, a UL-dedicated slot, or a UL primary slot). Also, the UE may or may not search for DCI including an interruption indicator, according to a service type (e.g., whether a first, second, or third-type service is supported).

FIG. 5 illustrates a position of a resource for which an interruption indicator may be provided. Referring to FIG. 5, six types of interruption indicators 512, 514, 516, 518, 520 and 522 that are providable according to an embodiment are illustrated. The BS may provide interruption information to the UE for the first-type service by simultaneously using one or two of the six types of interruption indicators 512, 514, 516, 518, 520 and 522. Characteristics of the six types of interruption indicators 512, 514, 516, 518, 520 and 522 are described below.

1. The first interruption indicator 512 may be included in DCI before interruption actually occurs and then may be transmitted to the UE for the first-type service. A physical DL control channel in which the DCI is to be transmitted may be configured in advance via upper signaling. The first interruption indicator 512 may include information about a particular time period (or including a frequency period) after the corresponding indicator is transmitted. The aforementioned operation may equally serve as an indicator indicating a reserved resource for a next service.

2. The second interruption indicator 514 may be included in when interruption actually occurs and then may be transmitted to the UE for the first-type service. A physical DL control channel in which the DCI is to be transmitted may be configured in advance via upper signaling. The second interruption indicator 514 may be included in a resource domain to which second-type data is allocated, and the second-type data may be allocated except for a portion of the resource domain, wherein the DCI including the second interruption indicator 514 is allocated to the portion. The second interruption indicator 514 may include information about a particular time period (or a frequency period) including a time when the corresponding indicator is transmitted, but according to another embodiment, the information about a particular time period (or a frequency period) may be skipped.

3. The third interruption indicator 516 may be included in DCI when interruption actually occurs and then may be transmitted to the UE for the first-type service. A physical DL control channel in which the DCI is to be transmitted may be configured in advance via upper signaling. The third interruption indicator 516 may be included in a resource domain to which first-type data is allocated, and the first-type data may be allocated except for a portion of the resource domain, wherein the DCI including the third interruption indicator 516 is allocated to the portion. The third interruption indicator 516 may include information about a particular time period (or a frequency period) including a time when the corresponding indicator is transmitted, but according to another embodiment, the information about a particular time period (or a frequency period) may be skipped.

4. The fourth interruption indicator 518 may be included in DCI when interruption actually occurs and then may be transmitted to the UE for the first-type service. A physical DL control channel in which the DCI is to be transmitted may be configured in advance via upper signaling. The fourth interruption indicator 518 may be included in a domain other than a resource domain to which first-type data is allocated. The fourth interruption indicator 518 may include information about a particular time period (or a frequency period) including a time when the corresponding indicator is transmitted, but according to another embodiment, the information about a particular time period (or a frequency period) may be skipped.

5. The fifth interruption indicator 520 may be included in DCI after interruption actually occurs and then may be transmitted to the UE for the first-type service. A physical DL control channel in which the DCI is to be transmitted may be configured in advance via upper signaling. The fifth interruption indicator 520 may be included in the time period 504 in which the first-type data is transmitted. The fifth interruption indicator 520 may include information about a particular time period (or a frequency period) prior to a time when the corresponding indicator is transmitted, but according to another embodiment, the information about a particular time period (or a frequency period) may be skipped.

6. The sixth interruption indicator 522 may be included in DCI after interruption actually occurs and then may be transmitted to the UE for the first-type service. A physical DL control channel in which the DCI is to be transmitted may be configured in advance via upper signaling. The sixth interruption indicator 522 may not be included in the time period 504 in which the first-type data is transmitted. The sixth interruption indicator 522 may include information about a particular time period (or a frequency period) prior to a time when the corresponding indicator is transmitted, but according to another embodiment, the information about a particular time period (or a frequency period) may be skipped.

The BS may transmit, to the UE, an interruption indicator via at least one of six physical DL control channels in which DCI including an interruption indicator is transmitted, and the UE supporting the first-type service may search for at least one of 6 candidates.

Operations of the UE may be described below. When the UE is receiving first-type data, after the UE receives the first-type data, or before the UE starts receiving the first-type data, the UE may search for a physical DL control channel in which DCI is transmitted, the DCI including an interruption indicator indicating whether interruption is to occur in a reception period (frequency or time) of the first-type data.

As another example, when the UE is receiving the first-type data or before the UE starts receiving the first-type data, the UE may not search for the physical DL control channel in which the DCI is transmitted, the DCI including an interruption indicator indicating whether interruption is to occur in a reception period (frequency or time) of the first-type data.

As another example, when the UE is not scheduled for the first-type data, the UE may not search for the physical DL control channel in which the DCI is transmitted, the DCI including an interruption indicator indicating whether interruption is to occur in a reception period (frequency or time) of the first-type data.

As another example, after the UE fails to perform demodulation and/or decoding on the first-type data, the UE may search for the physical DL control channel in which the DCI is transmitted, the DCI including an interruption indicator indicating whether interruption is to occur in a reception period (frequency or time) of the first-type data.

As another example, the UE may search for a physical DL control channel in which DCI is transmitted, the DCI including an interruption indicator indicating whether interruption is to occur in a region of a DL data resource (or a channel measurement resource) that is DL scheduled. In this regard, the DL data resource or the channel measurement resource may be first-type data.

As another example, the UE may not search for a physical DL control channel in which DCI is transmitted, the DCI including an interruption indicator indicating whether interruption is to occur in a region of a DL data resource (or a channel measurement resource) that is not DL scheduled. In this regard, the DL data resource or the channel measurement resource may be first-type data.

As another example, the UE may search for a valid physical DL control channel in which DCI is transmitted, the DCI including an interruption indicator indicating whether interruption is to occur in a region of a valid DL data resource Or a valid channel measurement resource) that is DL scheduled. In this regard, the DL data resource or the channel measurement resource may be first-type data.

As another example, the UE may not search for the valid physical DL control channel in which the DCI is transmitted, the DCI including an interruption indicator indicating whether interruption is to occur in the region of a valid DL data resource (or a valid channel measurement resource) that is not DL scheduled. In this regard, the DL data resource or the channel measurement resource may be first-type data.

In the disclosure, an example of a method by which the UE does not search for DCI may be one of the following.

The UE does not perform blind decoding on a control information format including DCI.

The UE does not perform blind decoding by using particular RNTI scrambled with DCI.

The UE does not perform searching for control information on a physical DL control channel resource domain that is configured for transmission of DCI.

When the UE succeeds in receiving information of an interruption indicator included in DCI via a valid DL control channel, the UE may determine that a frequency or time resource in a particular slot indicated by the interruption indicator is interrupted.

In this time, the LTE may completely discard, from a buffer of the UE, codeblocks or data to be decoded which partly overlaps with at least some of the frequency or time resource of a physical DL data channel resource domain, the frequency or time resource being in the particular slot indicated by the interruption indicator. For example, the UE may not store, in the buffer, the codeblocks or the data to be decoded which partly overlaps with at least some of the frequency or time resource in the particular slot indicated by the interruption indicator.

According to another embodiment, the UE may not HARQ combine the codeblocks with retransmitted codeblocks, wherein the codeblocks partly overlap with at least some of the frequency or time resource of the physical DL data channel resource domain, the frequency or time resource being in the particular slot indicated by the interruption indicator.

According to another embodiment, the UE may discard, from the buffer of the UE, a codeblock that is failed to be demodulated and/or decoded from among the codeblocks that partly overlap with at least some of the frequency or time resource of the physical DL data channel resource domain, the frequency or time resource being in the particular slot indicated by the interruption indicator. For example, the UE may not store, in the buffer, the codeblock that is failed to be demodulated and/or decoded front among the codeblocks that partly overlap with at least some of the frequency or time resource in the particular slot indicated by the interruption indicator.

According to another embodiment, the UE may not HARQ combine codeblocks with retransmitted codeblocks, wherein the codeblocks are failed to demodulated and/or decoded and partly overlap with at least some of the frequency or time resource of the physical DL data channel resource domain, the frequency or time resource being in the particular slot indicated by the interruption indicator.

According to another embodiment, the UE does not use a pre-configured physical DL data channel resource domain in demodulation and/or decoding (or HARQ combining), the pre-configured physical DL data channel resource domain corresponding to a time or frequency resource domain indicated by the interruption indicator.

According to another embodiment, the UE may discard a DL reference signal measurement value corresponding to the time or frequency resource domain indicated by the interruption indicator or may not perform measurement on a DL reference signal. Also, the UE may not report the DL reference signal measurement value to the BS.

For example, the BS may inform, by using transmission period indicator information included in the interruption indicator, the UE with interruption information of a next transmission period or a previous transmission period with respect to a transmission period (e.g., a slot) in which the interruption indicator is transmitted. For example, when 3 bits are used as a transmission period indicator included in the interruption indicator, the BS may inform, by using 8 pieces of information, which transmission period is indicated by the interruption indicator from a transmission period in which a current interruption indicator is transmitted. In detail, when the interruption indicator indicates interruption information of a previous transmission period, 000 may indicate a current transmission period, 001 may indicate an immediately previous transmission period, and 010 may indicate a next immediately previous transmission period.

However, this is merely an example, and according to another embodiment, the BS may provide information about a transmission period by configuring an interruption indicator in a manner that a bit is added to the interruption indicator or a previous transmission period is indicated when 1 bit among present bits is 0 and a next transmission period is indicated when 1 bit is 1. As another example, bits may be configured in a manner opposite to that described above.

According to another embodiment, it is possible to pre-configure a particular transmission period indicated by an interruption indicator in an upper signaling manner, a L1 signaling manner, or an implicit manner. In particular, a range of a transmission period which can be indicated by an interruption indicator may be limited according to transmission periodicity of a DL control channel via which DCI including interruption indicator information is transmitted. For example, when the transmission periodicity is every transmission period, the transmission period indicated by the interruption indicator information may be an immediately previous transmission period of a transmission period in which the interruption indicator information is transmitted. As another example, when transmission periodicity of the interruption indicator is two transmission periods, the transmission period indicated by the interruption indicator information may be the immediately previous transmission period and a next immediately previous transmission period of the transmission period in which the interruption indicator information is transmitted.

When a particular transmission period is indicated with respect to a transmission period (e.g., a slot) in which an interruption indicator is transmitted or a particular transmission period is indicated in an upper signaling manner, a L1 signaling manner, or an implicit manner, the interruption indicator may additionally include information indicating a frequency or time resource existing in the corresponding transmission period. To indicate the time resource, the time resource (e.g., an OFDM symbol value or number) existing in the transmission period may be specified by using a bitmap scheme or a particular rule, and to indicate the frequency resource, the frequency resource existing in the transmission period may be specified based on offset value(s) with respect to a Physical Resource Block (PRB) index or a primary frequency (a center or its boundary values of a frequency band in which PSS, SSS and PBCH used in an initial access are transmitted).

For example, the BS may transmit an interruption indicator including information indicating only a particular transmission period (e.g., a slot) to the UE. When the UE is allocated with a physical DL data channel resource corresponding to the particular transmission period indicated by the BS, the UE may discard codeblocks failed to be demodulated and/or decoded from the buffer or may discard an entire data channel resource from the buffer. For example, when the UE is allocated with the physical DL data channel resource corresponding to the particular transmission period indicated by the BS, the UE may not store the codeblocks failed to be demodulated and/or decoded in the buffer or may not store the data channel resource in the buffer.

When a DL data channel resource domain including DCI scheduled by using UE-common, UE group-specific, or UE-specific control information overlaps with a UE-common, UE group-specific, or UE-specific DL control area including an interruption indicator, the UE may or may not search for the control area including the interruption indicator. For example, when demodulation/decoding with respect to DL data information that is being received is adaptively supported according to interruption indicator information, the UE may search for the control area including the interruption indicator. As another example, when the UE cannot perform adaptive demodulation/decoding via the interruption indicator while the UE is receiving DL data, the UE may not search for the control area including the interruption indicator while the UE is receiving DL data.

An example of information transmitted via UE-common upper signaling, which is described in the disclosure, may include MIB transmitted via PBCH or SIB transmitted via PDSCH. An example of information transmitted via UE-specific upper signaling, which is described in the disclosure, may include RRC transmitted via PDSCH. An example of information transmitted via UE-common L1 signaling, which is described in the disclosure, may include UE-common control information transmitted via a UE-common control channel. An example of information transmitted via UE-specific L1 signaling, which is described in the disclosure, may include UE-specific control information transmitted via a UE-specific control channel.

Figure 6:
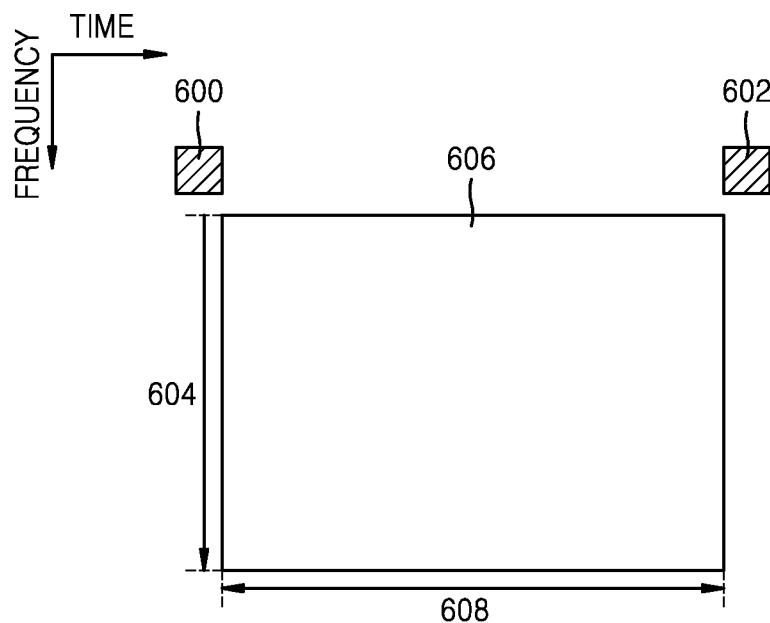
FIG. 6 is a diagram illustrating a relationship between a resource domain in which an interruption indicator is transmitted and a resource domain indicated by the interruption indicator, or a relationship between a resource domain in which a slot format indicator is transmitted and a resource domain to which the slot format indicator is applied, according to an embodiment.

FIG. 6 is a diagram illustrating a relationship between a resource domain in which an interruption indicator is transmitted and a resource domain indicated by the interruption indicator, or a relationship between a resource domain in which a slot format indicator is transmitted and a resource domain to which the slot format indicator is applied, according to an embodiment.

Physical channel resource domains 600 and 602 in which DCI including an interruption indicator is transmitted may be a UE-specific or UE-common physical channel resource domain, and UEs that are pre-configured via UE-common, UE group-common, or UE-specific upper signaling may search for the DCI including the interruption indicator in the corresponding physical channel resource domain. To search for the DCI including the interruption indicator, the UE may assume a particular DCI format including the interruption indicator and may detect the particular DCI format via blind decoding. According to another embodiment, when the interruption indicator uses a DCI format that is equal to that of other DCI, the UE may check RNTI scrambled with CRC transmitted together with the corresponding control information and thus, may determine whether the interruption indicator is included therein.

The physical channel resource domain in which the DCI including the interruption indicator is transmitted may be periodically or aperiodically transmitted to a particular UE or common UEs at regular time or frequency intervals. A physical channel resource domain 606 in which interruption indicated by the interruption indicator included in the DCI may occur may include a frequency period 608 and a time period 604, as illustrated in FIG. 6. The physical channel resource domain 606 in which interruption may occur may be a candidate physical channel resource domain for a resource domain for which information in a slot or symbol (group) unit of the interruption indicator indicates occurrence of interruption.

The time period 604 may be implicitly determined based on transmission periodicity of the DCI including the interruption indicator. That is, it means that a physical channel resource in which DCI including one or two interruption indicators is transmitted in the time period 604 does not overlap in terms of time. According to another embodiment, the time period 604 may be configured together when the interruption indicator is configured via UE-specific or LE-common upper signaling. The time period 604 may be composed of one or more slots.

The frequency period 608 indicates a frequency period that is commonly applied to UE capable of receiving the interruption indicator. Based on interruption indicator detail information configured via UE-specific or UE-common upper signaling, the frequency period may be configured as an entire system bandwidth, a UE-common frequency bandwidth part or particular subcarrier spacing.

For example, the interruption indicator included in the DCI may provide information about the physical channel resource domain 606 in which interruption may occur. The physical channel resource domain 600 or 602 including the interruption indicator may be or may not be included in the physical channel resource domain 606 in which interruption may occur, in terms of time and frequency. When the BS configures an interruption indicator to a particular UE group or common UEs, the BS may configure the physical channel resource domain 606 in which interruption may occur, in terms of time or frequency.

With reference to FIG. 6, there may be several methods of indicating an actually interrupted part in the time period 604 indicated by the interruption indicator. As a first method, information indicating the interrupted part in the time period 604 may include an interruption start symbol (or a slot or a combination thereof) index and an interruption end symbol (or a slot or a combination thereof) index.

As a second method, the information about the interrupted part with respect to the time period 604 may be provided in a bitmap scheme. A total number of symbols (or the number of valid DL data symbols) existing in the time period 604 included in the interruption indicator may be equally divided by a total number of bits allocated for time period information of the interruption indicator. Each of the bits indicating time period information may be used to indicate one or more symbol groups (or slots).

As a third method, to indicate the interrupted part in the time period 604, a method of indicating a slot indicator and symbol bitmap information in an indicated slot may be used. According to the method, the interruption indicator may be divided into a field for indicating a particular slot and a field for indicating an interrupted symbol (or a symbol group) in the indicated slot when transmission is performed at an interval of at least two slot periods.

As a fourth method, the information about the interrupted part in the time period 604 may be provided via the slot indicator and the interruption start symbol index and the interruption end symbol index in the indicated slot. This method is similar to the first method but, compared to the first method, a field for indicating a particular slot may be added when transmission is performed at an interval of at least two slot periods.

With reference to FIG. 6, there may be various methods of indicating an actually interrupted part in the frequency period 608 which is indicated by the interruption indicator. As a first method, a method of indicating the interrupted part in a bitmap scheme may be used. That is, to indicate, by using the interruption indicator, information about the actually interrupted particular part in the frequency period 608, a total number of configured bits may be divided with respect to the frequency period 608, and then the particular bit field may be used to indicate a partial frequency period of the frequency period 608. The partial frequency period may be configured as a multiple of a PRB or as a multiple of a frequency bandwidth part (BWP).

As a second method, a method of indicating an interrupted part via a combination of an index of a PRB where interruption starts and an index of a PRB where the interruption ends in terms of frequency may be used. A PRB index rule that is common to UEs receiving at least an interruption indicator may be applied to PRB indexes. According to another embodiment, when there are not conflict problems occurring due to that the UEs are implemented to distinguish between interruption domains, different PRB indexes may be applied.

Meanwhile, information indicating, via UE-specific or UE group upper signaling, whether a particular partial frequency period of the frequency period 608 is interrupted may be or may not be included in a bit field included in an interruption indicator. When not included, the interruption indicator may include only information about a time period in which an interruption occurs, and when a UE receives control information including the interruption indicator, the UE may assume that an entire frequency bandwidth corresponding to the time period may be interrupted.

When the UE receives UE-specific or UE-common DCI including interruption indicator information, the UE may discard received DL data information corresponding to a physical channel resource domain that is interrupted, and may perform re-decoding. When all particular codeblocks from among codeblocks that constitute the DL data information are interrupted, the UE may not perform re-decoding on the particular codeblocks. When only some codeblocks of a physical channel resource domain to which the particular codeblocks are allocated are interrupted, the some codeblocks having a value being equal to or smaller than a threshold value, the UE may perform HARQ-ACK reporting by performing re-decoding, or, to perform HARQ combining on a codeblock to be retransmitted thereafter, the UE may not store, in a buffer, only a received data value corresponding to the interrupted physical channel resource domain.

As another alternative scheme, the method of indicating an actually interrupted part in the time period 604 and the frequency period 608, which are indicated by the interruption indicator may be divided into a first-step indication method and a second-step indication method. The first-step indication method is a method of indicating, via upper signaling, an interrupted time domain or frequency domain of a pre-configured time period or frequency period at one time. The second-step indication method is a method of first indicating, via upper signaling, a particular sub time period or particular sub frequency period of a pre-configured time period or frequency period, and then indicating an actually interrupted time domain or frequency domain in the indicated particular sub time period or particular sub frequency period. That is, this method may be interpreted as a method of indicating a particular sub group in a time period or frequency period, and then indicating a particular value in the particular sub group.

The method may be more appropriate when the time period 604 or the frequency period 608 is significantly great, compared to the first-step indication method, or a bit overhead for an interruption indicator is great. The aforementioned two methods may be pre-configured in the standard or may be configured via UE-common or UE group upper signaling.

Also, as a method of indicating the time domain and the frequency domain, a successive scheme and a non-successive scheme may be used. The successive scheme refers to a method of successively indicating an interrupted area by indicating a start position and an end position of interruption (or an interruption period from the start position) indicated by an interruption indicator, the method being performed to indicate the time domain and the frequency domain. The non-successive scheme as a bitmap scheme refers to a method of indicating some valid sub time domains and some valid sub frequency domains with respect to a time domain or a frequency domain in which respective bits are valid, and may be used to indicate interruption information that intermittently occurs.

The aforementioned two methods may be pre-configured in the standard or may be configured via UE-common or UE group upper signaling. Also, the valid time domain refers to a time domain configured as a DL data physical channel resource, and the valid frequency domain refers to a frequency domain configured as a DL data physical channel resource.

FIG. 6 may be considered as drawing that shows a relationship between a resource domain in which a slot format indicator is transmitted and a resource domain to which the slot format indicator is applied. The physical channel resource domains 600 and 602 in which DCI including a slot format indicator is transmitted may be pre-configured in the standard or may be configured via UE-common or UE-specific upper signaling. The slot format indicator may be applied to only a system that is driven according to TDD.

The UE may recognize, due to the slot format indicator, a slot composed of the number of symbols configured with DL and the number of symbols configured with UL or a combination of the number of symbols that do not correspond to both DL and UL, with respect to one or more slots immediately after or a preset time after the slot format indicator is transmitted. As described above, the number of symbols may be configured via the slot format indicator, or several formats composed of a combination of the number of symbols used for a purpose other than pre-configured UL and DL may be pre-configured in the standard and one of them may be transmitted as the slot format indicator to the UE.

The slot format indicator may be transmitted in UE-specific, UE group-common or UE-common DCI via a UE-specific, UE group-common or UE-common DL control channel. When DCI including a particular DCI format is transmitted to the UE, the UE may detect the particular DCI format by performing blind decoding. According to another embodiment, when another DCI and a DCI format are shared, RNTI for a slot format indicator scrambled with a CRC combined with the DCI is scrambled, and the UE may be pre-configured with the RNTI and may detect slot format indicator information by performing CRC descrambling.

In this regard, the number of symbols included in the slot is 7 or 14, and the BS may pre-configure the number via UE-common or UE-specific upper signaling or a value may be defined in the standard.

According to another embodiment, the slot format indicator may be transmitted to the UE, in the form of a particular sequence other than the DCI. In this case, the UE may detect a value of the particular sequence and thus may determine which type from among pre-configured slot types corresponds to a slot type indicated by the slot format indicator. According to another embodiment, the slot format indicator may be configured as LTE PCFICH and may be transmitted to the UE.

The slot format indicator may provide information about which slot format is applied to the physical channel resource domain 606 including one or more slots. When a value of one of N slot formats (a combination of symbols used DL, UL, and a purpose other than that) is commonly applied to one or more slots, or values of several slots are indicated at one time, the slot format indicator may transmit slot format information applied to each of slots to a specific UE or common UEs via a UE-specific or UE-common control channel. The physical channel resource domain 606 indicated by the slot format indicator may include the frequency period 604 and the time period 608.

The frequency period 604 may correspond to a frequency unit including a system frequency bandwidth, a frequency bandwidth to which one or more subcarrier spacings are applied, a random frequency bandwidth, or a frequency band in which at least one of PSS/SSS/PBCH is transmitted. According to an embodiment, a frequency value of the frequency period 604 may be configured via UE-common or UE-specific upper signaling. According to another embodiment, both the frequency period 604 and slot format indicator information may be included in DCI and may be transmitted to a UE(s) via a UE-specific or UE-common control channel.

The time period 608 may include one or more slots. In this regard, a DL physical control channel resource in which DCI including at least two pieces of slot format indicator information in a time period indicated by the slot format indicator is transmitted may not overlap in terms of time. That is, the time period 608 may be implicitly configured as a value between DL physical control channel time resources in which successive slot format indicators are transmitted.

A DL physical channel resource domain including UE-specific or UE-common control information including the interruption indicator (or the slot format indicator) shown in FIG. 6 and a physical channel resource domain indicated by the interruption indicator (or the slot format indicator) may not overlap as shown in FIG. 6. However, this is merely an embodiment, and unlike to that shown in FIG. 6, according to another embodiment, the DL physical channel resource domain including UE-specific or UE-common control information and the physical channel resource domain indicated by the interruption indicator (or the slot format indicator) may overlap in terms of time or frequency or in terms of time and frequency.

Figure 7:
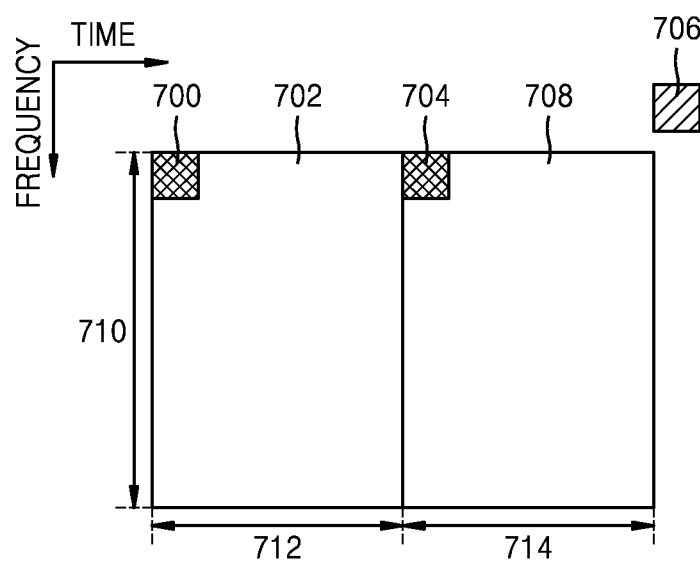
FIG. 7 illustrates a relationship among a downlink (DL) control channel in which an interruption indicator is transmitted, a DL control channel in which a slot format indicator is transmitted, and other data channels, according to an embodiment.

FIG. 7 illustrates a relationship among a DL control channel in which an interruption indicator is transmitted, a DL control channel in which a slot format indicator is transmitted, and other data channels, according to an embodiment.

Referring to FIG. 7, DCI or a sequence which includes the slot format indicator may be transmitted via a DL control physical channel resource 700 or 704. A first slot format indicator transmitted via the first DL control physical channel resource 700 may indicate a slot format in a time period 712 and a frequency period 710 of a first data physical channel resource 702, and a second slot format indicator transmitted via the second DL control physical channel resource 704 may indicate a slot format in a time period 714 and the frequency period 710 of a second data physical channel resource 708. In this regard, the time period 712 of the first data physical channel resource 702 and the time period 714 of the second data physical channel resource 708 may have values that are equal or different.

According to another embodiment, when the second slot format indicator does not exist, the first slot format indicator may provide slot format information about the two time periods 712 and 714 of the first data physical channel resource 702 and the second data physical channel resource 708. Also, the frequency period 710 to which a particular slot format indicated by the two slot format indicator is applied may be configured in frequency periods that are different from each other (or that partly overlap), unlike to that shown in FIG. 7. Each of the time periods 712 and 714 may include one or more slots. The frequency period 710 may be an entire system frequency bandwidth, a frequency bandwidth to which one or more particular subcarrier spacings are applied, or a frequency bandwidth that is randomly configured by the BS.

Also, information about the plurality of physical channel resource domains 702 and 708 in which interruption may occur may be provided at one time via a UE-specific, UE group-common or UE-common DL, control physical channel resource 706 on which the DCI including the interruption indicator is transmitted. The frequency period 710 indicated by the interruption indicator and the frequency period 710 indicated by each of the slot format indicators 700 and 704 may be equal to that shown in FIG. 7 or may vary while partly overlapping, unlike to that shown in FIG. 7, or one frequency period may include another frequency period.

Figure 8:
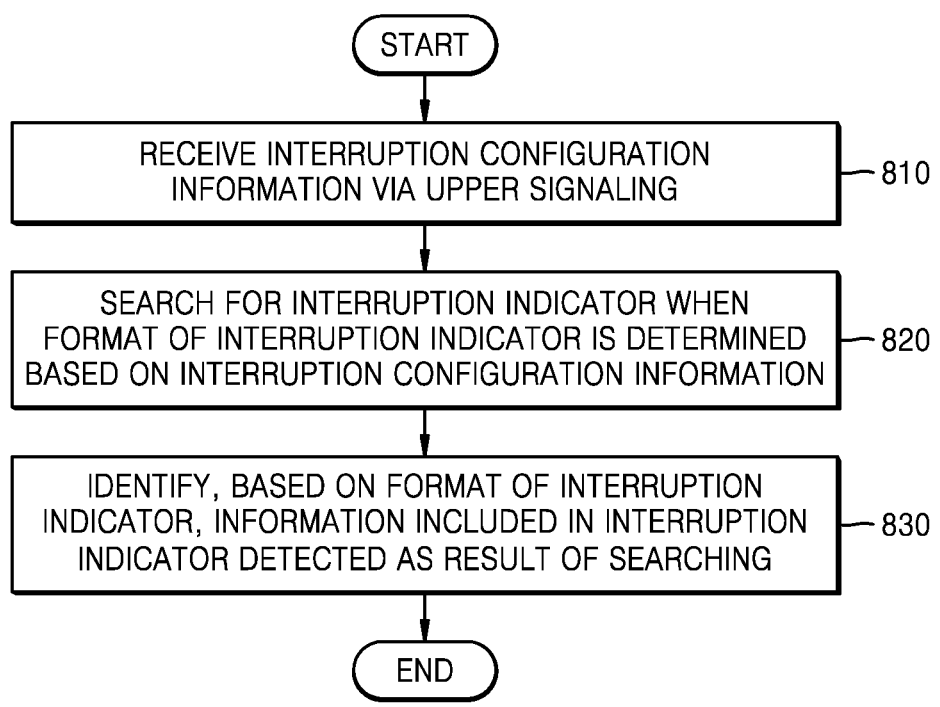
FIG. 8 is a flowchart for describing a method, performed by a user equipment (UE), of receiving interruption information, according to an embodiment.

FIG. 8 is a flowchart for describing a method, performed by a UE, of receiving interruption information, according to an embodiment.

In operation 810, the UE may receive interruption configuration information via upper signaling.

The UE according to an embodiment may receive the interruption configuration information via UE-specific or UE-common upper signaling. The interruption configuration information may include a physical resource domain that is indicative by interruption information and a physical resource domain in which the interruption information is transmitted. An example of the UE-specific upper signaling may be RRC or MAC CE. Also, an example of the UE-specific upper signaling may be SIB. The interruption configuration information may be one or a combination of the following. A physical resource domain that is indicative by the interruption indicator may be configured as one or more resource domains. Also, the corresponding resource domains may be simultaneously or respectively configured.

1. frequency information
2. time information
3. transmission resource information
4. existence or non-existence of information change 5. RNTI information
6. number of bits <Frequency Information>

The frequency information from among elements included in the interruption configuration information may indicate frequency period information that is indicative by the interruption indicator.

An example of the frequency period information may include frequency bandwidth part (BWP part) information or offset information based on a particular value of a system frequency bandwidth (or a frequency bandwidth in which PSS/SSS/PBCH are transmitted). In this regard, the particular value may be a minimum value, a maximum value or a medium value of the frequency bandwidth or the system frequency bandwidth, but these are merely examples and the particular value is not limited to the aforementioned examples. Also, the offset information may be provided as a start PRB position and end PRB position or a PRB period length.

According to another embodiment, the frequency period information may include information indicating a particular frequency part from among frequency parts obtained by equally n dividing the system frequency bandwidth. Here, n may be a natural number equal to or greater than 1.

According to another embodiment, the frequency period information may include information about a frequency bandwidth to which particular subcarrier spacing is applied.

According to an embodiment, the frequency information may include successive-frequency BWP part information or non-successive-frequency BWP part information Also, the frequency information may be provided as a combination of the aforementioned examples.

Also, the frequency bandwidth indicated according to the aforementioned configuration method may be considered as a frequency bandwidth that is indicative by the interruption indicator. Also, the UE may interpret the frequency bandwidth as a domain in which interruption may occur.

<Time Information>

The time information from among the elements included in the interruption configuration information may indicate time period information that is indicative by the interruption information.

An example of the time information may include time period information or absolute time period information which is configured in a particular slot unit, a particular symbol unit or a particular symbol (group) unit.

According to another embodiment, the time period information may include an offset value. Information about a time point or an end point of time information with respect to a slot start point or a slot end point may be provided based on the offset value.

According to another embodiment, an interval of transmitting the interruption indicator may be implicitly considered as the time period information that is indicative by the interruption information.

The time information according to an embodiment may include successive-time period information or non-successive-time period information.

<Transmission Resource Information>

The transmission resource information from among the elements included in the interruption configuration information may indicate information about a physical resource on which the interruption indicator is transmittable. An example of the transmission resource information may correspond to time and frequency information.

An example of the time information may include a value configured in a slot unit, a symbol unit, or a symbol (group) unit, a symbol boundary at which the interruption indicator is transmittable, the position being configured in a symbol unit or a symbol(group) unit with respect to a slot boundary, or a combination of the aforementioned examples.

An example of the frequency information may include a minimum frequency bandwidth value, a maximum frequency bandwidth value, or a medium value of a frequency bandwidth configured to the UE. Another example of the frequency information may include particular frequency period information configured in a PRB unit or a PRB group unit or information about a start point and an end point of a particular frequency period.

According to another embodiment, the interruption indicator may be included in UE-common or UE-specific control information and may be transmitted via a DL physical control channel, and thus the transmission resource information may be implicitly indicated based on DL physical control channel configuration information.

According to another embodiment, transmission control information may be adaptively transmitted only when the interruption information is constantly or partly transmitted or an interruption occurs in the DL physical control channel in which the UE-common control information is transmitted.

According to another embodiment, the interruption indicator may be transmitted only when an interruption occurs in a part of frequency and time resource domains indicative by the interruption indicator.

*<Existence or Non-Existence of Information Change>

Existence or non-existence of information change from among the elements included in the interruption configuration information may indicate whether information configured via upper signaling may be changed according to L1 signaling or other upper signaling information.

For example, when it is configured that the information change is available, the physical channel resource domain that is indicative by the interruption indicator may be changed according to UE-specific or UE-common L1 signaling information or other upper signaling information. For example, a slot format indicator that is transmittable via UE-common L1 signaling may correspond thereto. As another example, a DL physical control channel domain that is transmittable via UE-common L1 signaling or UE-specific or UE-common upper signaling may correspond thereto.

<RNTI Information>

The RNTI information from among the elements included in the interruption configuration information may indicate information of the RNTI scrambled with CRC combined with DCI so as the DCI including the interruption indicator being detected at the UE. A value defined in the standard may be used as RNTI, a RNTI value separately configured based on particular RNTI configured in each UE may be derived and used, or information about RNTI may also be given via upper signaling about interruption and may be used.

<Number of Bits>

The number of bits constituting the interruption indicator information may be configured via upper signaling. According to another embodiment, the number of bits may be implicitly determined based on the time information, the frequency information, or the transmission resource information which may be configured via upper signaling. According to another embodiment, bit number information may be implicitly configured according to particular DCI configuration that is separately different. In this regard, the number of bits may indicate the largest number of bits that may be included in DCI or may indicate the number of bits for actual interruption indicator information.

The number of bits included in the interruption indicator may be determined, based on a size of physical time and frequency resource domains, and time or frequency unit formation, which are indicated by the interruption indicator configured via upper signaling. In this regard, the time unit information may be configured in a slot or symbol unit, and the frequency unit information may be configured in a PRB or PRB group unit. The number of bits may be determined, assuming a particular DCI transmission period and particular resource domain information other than that. For example, when the largest number of symbols of a DL control channel, the symbols being transmittable in every slot, is 2, the number of bits may be determined based on residual transmission symbols excluding the two symbols. As another example, the number of bits may be determined according to a position of demodulation reference signal (DMRS) for transmission in a slot unit configured UE-common (such as SIB) upper signaling, the DMRS being an example of control information transmission period information.

In operation 820, when a format of the interruption indicator is determined based on the interruption configuration information, the UE may search for the interruption indicator. The UE may determine a format of DCI that may include the interruption indicator, based on the interruption configuration information obtained via upper signaling, and may search for interruption information.

According to an embodiment, elements requested to determine the format of the DCI may include a DCI bit (field) size, a DCI transmission interval, or a transmission resource domain in which the DCI is transmitted. The DCI including the interruption indicator may include only the interruption indicator or may also include a plurality of pieces of other information for downlink control in addition to the DCI. The DCI may be UE-specific DCI or UE-common DCI. The UE-specific DCI may be transmitted via a UE-specific or UE-common DL physical control channel. The UE-common DCI may be transmitted via the UE-specific or UE-common DL physical control channel.

The UE may be configured, via upper signaling, with RNTI scrambled with CRC combined to the DCI including the interruption indicator or may assume RNTI information defined in the standard, and then may attempt detection by performing descrambling. In other words, the UE may detect the DCI by descrambling the DCI including the interruption indicator by using particular RNTI (e.g., INT-RNTI, RNTI for interruption) that is pre-configured via upper signaling or defined in the standard. According to another embodiment, the UE may detect the DCI including the interruption indicator by using information such as C-RNTI.

The UE may determine the format of the interruption indicator, based on the information received via upper signaling in aforementioned operation 810, and may detect the interruption indicator, according to the determined format. The UE may constantly or adaptively search for a physical channel resource domain in which the interruption indicator is transmitted.

An example of adaptive searching may correspond to one or a combination of at least two of the following. In other words, only when one or a combination of at least two of the following is fulfilled, the UE may search for the DCI including interruption indicator information via the physical DL control channel that is pre-configured via upper signaling.

1. When it is successful in searching for DCI scrambled with particular RNTI C-RNTI, SPS-RNTI other than SPS-RNTI indicating release, or RNTI indicating data transmission)

2. When searching for of the DCI is successful and a DL physical data channel resource domain indicated by the control information overlaps at least a part of a physical channel resource domain indicative by the interruption information configured via signaling 3. When searching for of DCI scrambled with particular RNTI (e.g., C-RNTI or SPS-RNTI other than SPS-RNTI indicating release) is configured DL data information scheduled via the DCI scrambled with the particular RNTI may include at least one of unicast information, multicast information, or broadcast information. For example, when the UE receives scheduling of unicast data information, scheduling of multicast data information, or scheduling of broadcast data information, the UE may search for the DCI including the interruption indicator via a physical DL control channel pre-configured via upper signaling.

As another example, an example of DL data information scheduled via the DCI scrambled with the particular RNTI may include data for a particular service (e.g., eMBB or mMTC) or system data (SIB, RRC, MAC CE or Paging) For example, when the UE receives scheduling of eMBB data information or receives scheduling of information other than system data, the UE may search for the DCI including the interruption indicator via a physical DL control channel pre-configured via upper signaling.

According to an embodiment, when the UE is configured with searching for of the DCI including the interruption indicator, and a PDSCH resource domain scheduled via control information such as C-RNTI for scheduling PDSCH overlaps, by a part or a preset threshold value, a resource domain in which interruption may occur and that is indicative by the interruption indicator, the UE may search for a DL control channel in which control information including the interruption indicator is transmitted.

According to another embodiment, when the UE is configured with searching for of the control information including the interruption indicator, and a PDSCH resource domain scheduled via control information such as C-RNTI for scheduling PDSCH does not overlap a resource domain in which interruption may occur and that is indicative by the interruption information the UE may not search for a DL control channel in which the control information including the interruption indicator is transmitted.

According to another embodiment, when the UE is configured with searching for of the control information including the interruption indicator, and a PDSCH resource overlapping at least a part of a resource domain indicative by the interruption indicator is scheduled via PDCCH scrambled with RNTI such as C-RNTI for indicating PDSCH scheduling, the UE may search for a DL control channel in which control information including the interruption indicator is transmitted.

According to another embodiment, when the UE is configured with searching for of the control information including the interruption indicator, and a PDSCH resource overlapping at least a part of a resource domain indicative by the interruption indicator is not scheduled via PDCCH scrambled with RNTI such as C-RNTI for indicating PDSCH scheduling, the UE may not search for a DL control channel in which control information including the interruption indicator is transmitted.

When the BS performs PDSCH data scheduling of a resource domain on a particular UE, the resource domain overlapping at least a part of a resource domain indicative by an interruption indicator, the BS may transmit control information via a DL control channel in which the control information including the interruption indicator is transmitted. When PDSCH data scheduling of a resource domain overlapping at least a part of a resource domain indicative by an interruption indicator does not exist for a particular UE(s), the BS may not transmit control information via a DL control channel in which the control information including the interruption indicator is transmitted.

The BS may adaptively or constantly transmit, to the UE, DCI including interruption information, based on physical channel resource domain information indicative by the interruption indicator transmitted via upper signaling in aforementioned operation 810. In an example of adaptive transmission, only when at least a part of a domain in which interruption actually occurs overlaps the physical channel resource domain information indicative by the interruption indicator transmitted via upper signaling in aforementioned operation 810, the BS may scramble, by using pre-configured RNTI, DCI including the interruption indicator with CRC combined with the DCI and then may transmit the scrambled DCI via a pre-configured physical DL control channel.

As a first method of determining the format of the DCI including the interruption indicator, the UE may determine each of bits constituting a control information format, based on a time period size and a frequency period size, and a time unit and a frequency unit, which are configured based on the interruption configuration information obtained via upper signaling. For example, when the time period size is T_d, the frequency period size is F_d, a minimum time unit is t_g, and a minimum frequency unit is f_g, a total number of bits (n_t) for indicating time information may be determined by using Equation 1 or Equation 2 below.

$$n\_t = \text{floor}(T\_d/t\_g) \qquad \text{[Equation 1]}$$

$$n\_t = \text{ceil}(T\_d/t\_g) \qquad \text{[Equation 2]}$$

As another example, the number of bits (n_f) for indicating frequency information may be determined by using Equation 3 or Equation 4 below.

$$n\_f = \text{floor}(F\_d/f\_g) \qquad \text{[Equation 3]}$$

$$n\_f = \text{ceil}(F\_d/f\_g) \qquad \text{[Equation 4]}$$

Each of the aforementioned Equations is composed of three parameters including the number of bits, a time period size, and a time unit, and when information about two of three parameters is given via UE-common or UE-specific upper signaling, the UE may be implicitly configured with information about residual one. For example, when information about two parameters from among parameters of n_t, T_d and t_g composing Equation 1 and Equation 2 is given via UE-common or UE-specific upper signaling, the UE may implicitly determine information about residual one. As another example, the aforementioned three parameters may be all transmitted to the UE via upper signaling.

Similar to the aforementioned example, when the UE receives, via UE-common or UE-specific upper signaling, information about two parameters from among parameters of n_f, F_d, and f_g composing Equation 3 and Equation 4 that are equations to determine the number of bits for determining frequency information, the UE may implicitly determine information about residual one. As another example, the aforementioned three parameters may be all transmitted to the LIE via upper signaling.

Two or all of three of n_t, T_d, and t_g may be time information that can be configured via upper signaling. Two or all of three of n_f, F_d, and f_g may be frequency information that can be configured via upper signaling. However, this is merely an example, and at most two parameters from among the parameters included in the aforementioned time information or frequency information may be transmitted to the UE via upper signaling.

As a second method of determining the format of the DCI including the interruption indicator, the UE may simultaneously determine bits constituting a control information format, based on a time period size and a frequency period size, and a time unit and a frequency unit, which are configured via upper signaling. That is, one bit information may indicate a resource domain including a particular time period and a particular frequency bandwidth period. For example, when the time period size is T_d, the frequency period size is F_d, the time unit is t_g, and the frequency unit is f_g, a total number of bits (n) for indicating time/frequency information may be determined by using Equation 5 or Equation 6 below.

$$n = \text{ceil}(T\_d/t\_g) \times \text{ceil}(F\_d/f\_g) \qquad \text{[Equation 5]}$$

$$n = \text{floor}(T\_d/t\_g) \times \text{floor}(F\_d/f\_g) \qquad \text{[Equation 6]}$$

With respect to aforementioned Equation 5 and Equation 6, when the UE is configured with information about four of five parameters via UE-common or UE-specific upper signaling, the UE may be implicitly configured with information about residual one. With respect to aforementioned Equation 5 and Equation 6, when the UE receives information about four parameters from among n, T_d, t_g, F_d, and f_g via upper signaling, the UE may implicitly determine information about residual one. As another example, the UE may receive information about aforementioned five parameters via upper signaling. Four or all five from among n, T_d, t_g, F_d and f_g may be configured as the time and frequency information via upper signaling, and information of a lesser number from among them may be configured.

For example, the frequency period size and the frequency unit may correspond to a PRB or PRB group. As another example, the frequency period size and the frequency unit may correspond to a value obtained by equally N dividing a particular (or default) BWP bandwidth value or system frequency bandwidth. Also, for example, the time period size and the time unit may correspond to a symbol, a symbol group, a sub slot, a slot, or slot groups.

One or more time periods other than the time period size may be combined to configure a time group period set. That is, the time group period set may include one or more time periods, and may be added to an interruption indicator according to a size of the time group period set. For example, when the time period size is T_d, the size of the time group period set is SxT_d, and as a bit number for indicating a particular time period of the time group period set, S bits may be configured or floor(log 2(S)) or ceil(log 2(S)) bits may be configured. The bits may be used to indicate separate time information as well as the interruption indicator.

When a frequency group period set is configured, the aforementioned method may be equally applied to bit determination information associated therewith. One or more frequency periods other than the frequency period size may be combined to configure a frequency group period set. That is, the frequency group period set may include one or more frequency periods, and may be added to an interruption indicator according to a size of the frequency group period set. For example, when the frequency period size is F_d, the size of the frequency group period set is W×F_d, and as a bit number for indicating a particular frequency period of the frequency group period set, W bits may be configured or floor(log 2(W)) or ceil(log 2(W)) bits may be configured. The bits may be used to indicate separate frequency information in the interruption indicator information.

Only one of the aforementioned two methods may be supported according to the standard or one of the two methods may be determined via UE-common or UE-specific upper signaling.

In operation 830, the UE may identify, based on the format of the interruption indicator, information included in the interruption indicator detected as a result of the searching.

The UE may detect the interruption indicator by searching for the DCI including the interruption indicator, and may interpret information of fields constituting the DCI. The UE may interpret or identify a bit field allocated as the interruption indicator in the DCI.

In FDD, it is possible for the UE to interpret the bit field in the interruption indicator, based on a control information transmission period (e.g., control format indicator (CFI) of LTE) and reserved resource domain information. For example, when the number of symbols for a valid physical DL data channel is determined based on the largest number of symbols constituting the control information transmission period, the UE may differently interpret information of the bit field constituting the interruption indicator, based on information about the largest number of symbols. The UE may be configured with information about the control information transmission period or the reserved resource domain information via UE-common or UE-specific upper signaling or UE-common or UE-specific L1 signaling. According to another embodiment, the UE may interpret the interruption indicator, based on information about the interpretation of the bit field constituting the interruption indicator included in the DCI. For example, the UE may interpret the bit field constituting the interruption indicator, based on a value of the information about the interpretation of the bit field constituting the interruption indicator.

In TDD, operations thereof are generally similar to operations of FDD, but slot format indicator information may be additionally provided to UE-specific or UE-common DCI that may be transmitted via a UE-common or UE-specific control channel. The UE may determine, based on the slot format indicator information, the number of symbols constituting a valid data channel or a resource domain of valid DL data channel information. Also, the UE may interpret or identify a bit field of the interruption indicator, based on the determined number of valid symbols or the resource domain.

According to another embodiment, other than the aforementioned method of interpreting a bit field, examples of a method of interpreting a control information bit field and a format of control information on which the interruption indicator is transmitted, based on a plurality of pieces of information determining interpretation of the interruption indicator may be possible as below.

As a first method, a total number of bits included in interruption information may be determined based on the number of valid DL symbols indicated in a control information transmission period (e.g., CFI of LTE) or reserved resource domain information, or a DCI domain composed of time and frequency resources. Also, in TDD, a slot format indicator may be considered together with the control information transmission period or the reserved resource domain information.

As a second method, the interruption indicator and a total number of bits may be fixed, and interrupted-time and frequency period domain information indicated by respective bits may be determined based on the number of valid DL symbols indicated in a control information transmission period (e.g., CFI of LTE) or reserved resource domain information, or a DCI domain composed of time and frequency resources. Also, in TDD, a slot format indicator may be considered together with the control information transmission period or the reserved resource domain information.

As a third method, the interruption indicator and a total number of bits may be fixed, and actually valid time and frequency periods may be determined by comparing predefined time and frequency period domains indicated by respective bits, based on the number of valid DL symbols indicated in a control information transmission period (e.g., CFI of LTE) or reserved resource domain information, or a DCI domain composed of time and frequency. Also, in TDD, a slot format indicator may be considered together with the control information transmission period or the reserved resource domain information.

According to the first method, the number of bits is adjusted based on the control information transmission period (e.g., CFI of LTE) or the reserved resource domain information (or, in TDD, the slot format indicator), such that the number of bits for optimized interruption indicator information may be determined. For example, when the number of bits for the valid DL data channel which is indicated by the slot format indicator information is small, the number of bits for the interruption indicator is also decreased, such that the number of bits may be efficiently managed.

However, a transmission period of the DCI including the interruption indicator and the control information transmission period (e.g., CFI of LTE) or a transmission period of DCI including the reserved resource domain information (or, in TDD, the slot format indicator) are different from each other or offsets therebetween are different, the interpretation of the number of bits included in the interruption indicator may be different between the BS and the US. For example, in a situation where indicators with two different slot formats for two slots are transmitted whereas only one interruption indicator for the two slots is transmitted, when the UE fails to receive even one of information of the two different slot format indicators or indicates a value different from actual information, there is a probability that the number of effective bits of the interruption indicator which is determined by the UE is different from the number of bits the BS actually uses for the interruption indicator. Therefore, when the DCI including the interruption indicator information and the DCI including the slot format indicator information have equal periods and offset values in terms of time, the method thereof may be effective.

According to the first method, the format of the DCI including the interruption indicator which is determined in aforementioned operation 802 may be changed. That is, when the number of bits constituting actually valid interruption information varies according to the control information transmission period (e.g., CFI of LTE) or the reserved resource domain information (or, in TDD, the slot format indicator), the control information format the BS is requested to search for via the pre-configured physical DL control channel may vary. According to another embodiment, even when the number of bits constituting the valid interruption indicator is changed, when the largest number of available bits of the interruption indicator is configured, the UE may determine that the control information includes the largest number of bits, without changing the control information format, and may perform blind decoding. Also, the UE may determine that only an actually valid bit field among the largest number of bits is configured as the interruption indicator.

According to the second method, unlike to the first method, there is not a change in the number of bits constituting the interruption indicator, and thus a problem that may occur when the UE and the BS determine the different numbers of bits for the interruption indicator may not occur. However, instead, configuration of an interruption domain which is indicated by the interruption indicator may be changed according to an actual DL valid symbol period (or a physical channel data resource domain composed of valid time and frequency resources) indicated by the control information transmission period (e.g., CFI of LTE) or the reserved resource domain information (or, in TDD, the slot format indicator).

However, in a situation where a total of fourteen valid DL data symbols are configured, when the interruption indicator information is composed of seven bits, each bit may be used to indicate, by using a bitmap scheme, existence or non-existence of interruption with respect to two consecutive valid DL data symbol groups. However, when a total of seven valid DL data symbols are configured by the slot format indicator, the BS may use seven bits constituting the pre-configured interruption indicator only for the seven valid DL data symbols configured by the slot format indicator. That is, each bit may be used to indicate existence or non-existence of interruption with respect to each valid DL data symbols. Furthermore, when only three valid DL data symbols exist by the slot format indicator, it is sufficient for three bits among seven bits to respectively indicate existence or non-existence of interruption with respect to the three valid DL data symbols, and thus residual four bits may be used to additionally indicate (by using a bitmap scheme or a particular frequency bandwidth indication scheme) information about a frequency domain in a physical channel resource domain in which interruption may occur. According to the aforementioned method, the total number of bits of the interruption indicator is not changed, but information configuration indicated by the interruption indicator may be changed. Accordingly, similar to the first method, when a period (or offset) in which the DCI including the interruption indicator is transmitted is different from a period (or offset) in which the DCI including the slot format indicator is transmitted, even when the UE detects the interruption indicator, the interruption domain information indicated by each bit included in the interruption indicator information may be different from that of the BS. Therefore, the method may be used when the control information including the interruption indicator and the control information including the slot format indicator information have equal periods and offsets. When a slot indicator and symbols constituting a slot thereof are configured by using a bitmap scheme (e.g., n1 bits from among the bits constituting the interruption indicator are an indicator to indicate an interrupted particular slot, and n2 bits are an indicator to indicate, by using a bitmap scheme, interrupted symbols in the slot indicated by the n1 bits), other than a method of indicating, by using a bitmap scheme, existence or non-existence of interruption with respect to an entire time period configured with the interruption indicator, the method may be sufficiently used even when the control information including the interruption indicator and the control information including the slot format indicator information do not have equal periods and offsets. It is because, even when the total number of bits of the interruption indicator is not changed and the interruption indicator indicates a slot from which the UE fails to receive the interruption indicator information, there is possibility that the UE actually receives DL data from the slot. Therefore, when an interruption indicator indicates, to the UE, a slot indicator and information about symbols in a slot for which slot format indicator information is received in a valid manner, the UE may sufficiently determine that bit configuration of the interruption indicator with respect to the slot indicated by the interruption indicator is equal to that of the BS. Instead of the slot format indicator described in the aforementioned example, the control information transmission period (e.g., CFI of LTE) or the reserved resource domain information may be replaced and applied.

The third method is similar to the second method, but, regardless of the number of valid symbols (or a physical DL data resource domain composed of valid time and frequency) for a valid DL data channel indicated by the control information transmission period (e.g., CFI of LTE) or the reserved resource domain information (or, in TDD, the slot format indicator), an interruption domain composed of frequency and time resources indicated by respective bits constituting the interruption indicator may not be changed. Instead, a valid interruption domain in the interruption domain may be defined only by the number of valid symbols indicated by the slot format indicator. For example, in a situation where one bit from among a total number of bits constituting the interruption indicator basically indicates existence or non-existence of interruption with respect to three consecutive symbols, when only one of the three consecutive symbols is used, via the slot format indicator, as an actually valid DL data channel, the BS may configure one bit to indicate a symbol for the one actually valid DL data channel, the one bit being from among a total number of bits constituting the interruption indicator. The method may be sufficiently applied to a situation where the control information including the interruption indicator and the control information including the slot format indicator information have different periods or different offsets. However, when a symbol for a valid DL data channel does not exist in a domain indicated by one bit from among a total number of preset bits constituting the interruption indicator, the corresponding bit cannot indicate any interruption information to UEs nor can be sufficiently used for any other purpose. Instead of the slot format indicator described in the aforementioned example, the control information transmission period (e.g., CFI of LTE) or the reserved resource domain information may be used.

The UE may discard or may not store resources in a soft buffer or may (re)perform decoding excluding a resource domain, the resources corresponding to the interrupted resource domain in UE's scheduled data resource domain that is pre-received or is being received by receiving the interruption indicator. According to another embodiment, when same data is retransmitted or a part (e.g., a code block or a code block group) of the same data is retransmitted, the UE may not perform HARQ combining on the retransmitted data and soft bits corresponding to a corresponding interrupted resource domain part.

When an interrupted resource domain is equal to or greater than a predefined threshold value or a valid data resource domain is equal to or greater than the predefined threshold value, compared to UE's scheduled data resource domain that is pre-received or is being received by receiving the interruption indicator, the UE may not perform a HARQ-ACK result report with respect to reception of DL data. According to another embodiment, when the interrupted resource domain is equal to or less than the predefined threshold value or the valid data resource domain is equal to or less than the predefined threshold value, compared to UE's scheduled data resource domain that is pre-received or is being received by receiving the interruption indicator, the UE may not perform a HARQ-ACK result report with respect to the DL data. The valid data resource domain indicates a data domain except for the interrupted resource domain of the data resource domain pre-indicated by the DCI. The UE may receive information about the interrupted resource domain via control information including corresponding information. The corresponding information may be included in UE-specific or UE-common control information and may be transmitted from the BS to the UE via a UE-specific or UE-common control channel.

Figure 9:
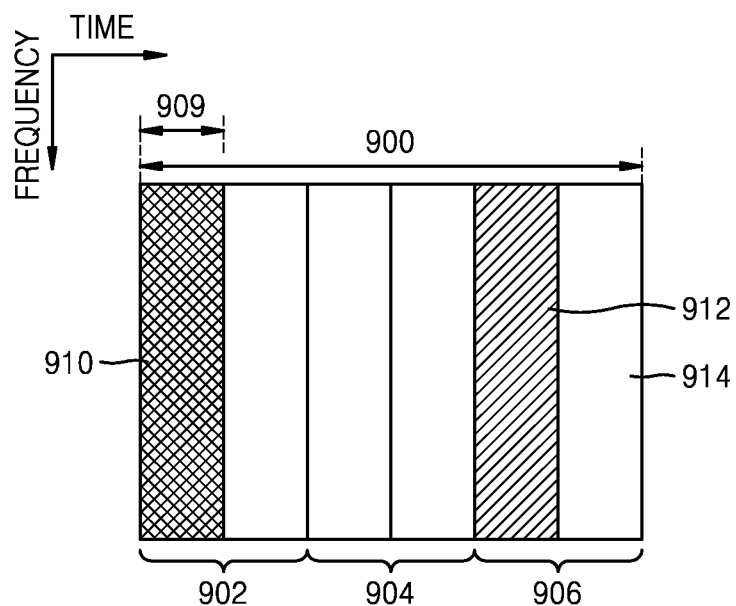
FIG. 9 is a diagram illustrating a method of configuring an interruption indicator according to a slot format indicator, according to an embodiment.

FIG. 9 is a diagram illustrating a method of configuring an interruption indicator according to a slot format indicator, according to an embodiment.

Referring to FIG. 9, a time period 900 indicated by the interruption indicator may include one or more slots. The time period 900 may be almost equally dividing into partial time periods 902, 904 and 906 according to the total number of bits included in interruption indicator information, and whether interruption is to occur in each of the partial time periods 902, 904 and 906 may be indicated to a particular UE or UEs of a group. The aforementioned equally dividing of the time period into the partial time periods means that the total number of symbols in a particular slot included in the time period 900 which is indicated by the interruption indicator may be equal to or different from the total number of symbols indicated by a plurality of respective pieces of bit information according to the total number of bits excluding a bit for slot indicator included in the interruption indicator. Each of the partial time periods 902, 904 and 906 may include one or more symbols.

A physical channel resource domain 910 including a particular symbol group of the partial time period 902 in FIG. 9 may be pre-configured as a physical channel control resource for DCI via UE-specific or UE-common upper signaling In FIG. 9, reference numeral 909 may indicate one OFDM symbol unit supporting one particular subcarrier spacing, a symbol group unit composed of at least two OFDM symbols, or a slot unit. In this case, the UE may determine that interruption information is valid only in a time period except for the physical channel resource domain 910 for control information, the time period being included in the partial time period 902 indicated by the interruption indicator. Also, when a physical channel resource domain 912 including a particular symbol group of the partial time period 906 is not used for a DL but is used for a UL or a purpose other than the DL via slot format indicator information, the UE may determine that the interruption information is valid in a valid time period 914 of the partial time period 906 except for the physical channel resource domain 912 not being used for the DL, the partial time period 906 being indicated by the interruption indicator. The situation described with reference to FIG. 9 corresponds to the third method from among the three methods of configuring an interruption indicator described with reference to FIG. 8.

Referring to FIG. 9, the UE may consider only a valid DL data channel and thus may determine validity of interruption with respect to a symbol group indicated by the interruption indicator. A method of considering the valid DL data channel may be configured, in consideration of situations below.

1. Minimum or maximum symbol(s) configured for a DL control channel

2. Symbol(s) configured for PSS/SSS/PBCH and symbol(s) on which UE-common important control information (SIB) other than PSS/SSS/PBCH is transmitted 3. Symbol(s) configured for UL data or a purpose other than a data channel Because the different numbers of DL control channel symbols may be configured for respective UEs, a valid DL data channel may be determined based on the smallest or largest number of symbols configured for each DL control channel. Because all UEs are commonly configured with a DL control channel symbol, the smallest number of symbols of all UEs may be configured as 1, and in a case of the largest number of symbols, a value of 3 or 4 consecutive symbols may be configured for each of the UEs.

The slot format indicator described with reference to FIG. 9 may be replaced with a DCI transmission period, a resource domain composed of time and frequency resources, or a reserved resource domain, which can be configured via upper signaling or L1 signaling, and then may be applied.

Figure 10:
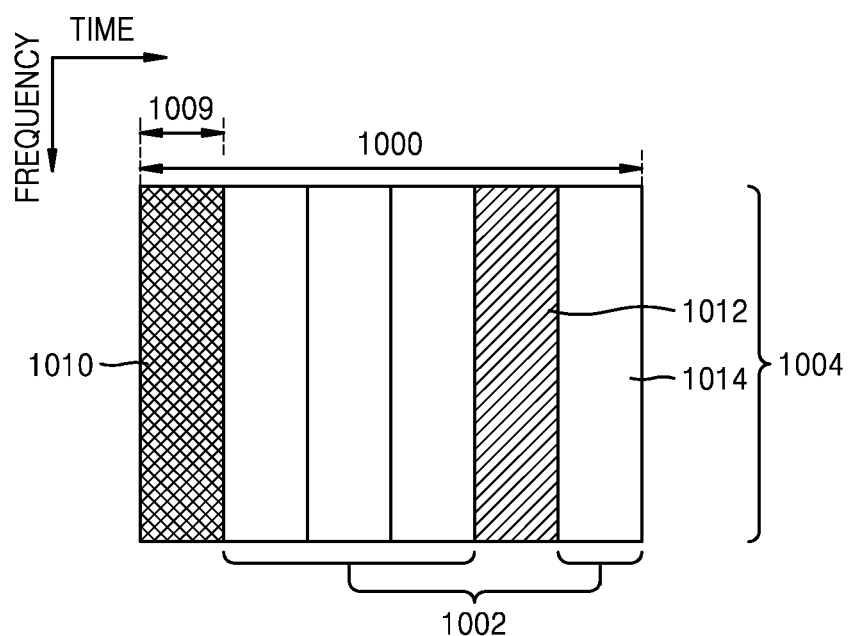
FIG. 10 is a diagram illustrating a method of configuring an interruption indicator according to a slot format indicator, according to another embodiment.

FIG. 10 is a diagram illustrating a method of configuring an interruption indicator according to a slot format indicator, according to another embodiment.

Referring to FIG. 10, the interruption indicator may provide interruption information about a time period 1000 and a frequency period 1004 to a pre-configured particular UE or UE groups. The interruption indicator may provide interruption information about a time period 1000 of a valid DL data channel excluding a physical channel resource domain 1010 configured via a UE-specific or UE-common control channel and a physical channel resource domain 1012 indicated by a slot format indicator and used for a purpose other than a DL. In this regard, it is assumed that the total number of bits constituting a pre-configured interruption indicator is fixed. Referring to FIG. 10, reference numeral 1009 may indicate one OFDM symbol unit supporting one particular subcarrier spacing, or a symbol group unit composed of at least two OFDM symbols.

For example, when the total number of bits used by the interruption indicator to indicate time information is n, each bit may be used to sequentially indicate interruption information about $$\left\lceil \frac{k}{n} \right\rceil$$

symbol groups or $$\left\lfloor \frac{k}{n} \right\rfloor$$

consecutive symbol groups), with respect to a total symbol number k constituting a valid time period 1002 in one slot used as a DL data channel corresponding to the frequency interval 1004. When k is smaller than n, n-k bit(s) may be used to additionally indicate the frequency interval 1004. When information previously used to indicate frequency information is not included in the interruption indicator, n-k bit(s) may be used to indicate the frequency information. According to another embodiment, when the information previously used to indicate the frequency information is included in the interruption indicator, the frequency information may be further particularly provided by using existing bits along with additional n-k bit(s). To indicate an interrupted frequency domain, a method of indicating partial frequency domains indicated by respective bits according to a bitmap scheme in consideration of the number of bits allocated for a frequency of an entire frequency resource domain in which interruption may occur and which is indicated by an interruption indicator, or a method of indicating one frequency domain in consideration of a total number of cases providable based on the number of bits may be used. For example, when two bits for a frequency exist, according to the first method, a frequency bandwidth that may be interrupted, which is indicative by the interruption indicator, may be divided into two frequency bandwidths, and the divided frequency bandwidths may be indicated by respective bits. According to the second method, because the number of pieces of information providable by using two bits is 4, the frequency bandwidth that may be interrupted may be divided into four frequency bandwidths and the divided frequency bandwidths may be respectively indicated by four bit combinations.

According to the first method, it is possible to indicate existence or non-existence of interruption with respect to an entire frequency bandwidth, but according to the second method, it is possible to provide indication with respect to only a part of the entire frequency bandwidth.

According to a method modified from the second method, even when a total of four pieces of information are provided by using two bits, the frequency bandwidth that may be interrupted is divided by 3, not 4, such that a particular bit combination value may indicate, with respect to the entire frequency bandwidth, a bandwidth where an interruption occurred or a bandwidth where interruption is not occurred.

The slot format indicator described with reference to FIG. 10 may be replaced with a DCI transmission period (or, a resource domain composed of time and frequency resources), or a reserved resource domain, which can be configured via upper signaling or L1 signaling.

Figure 11:
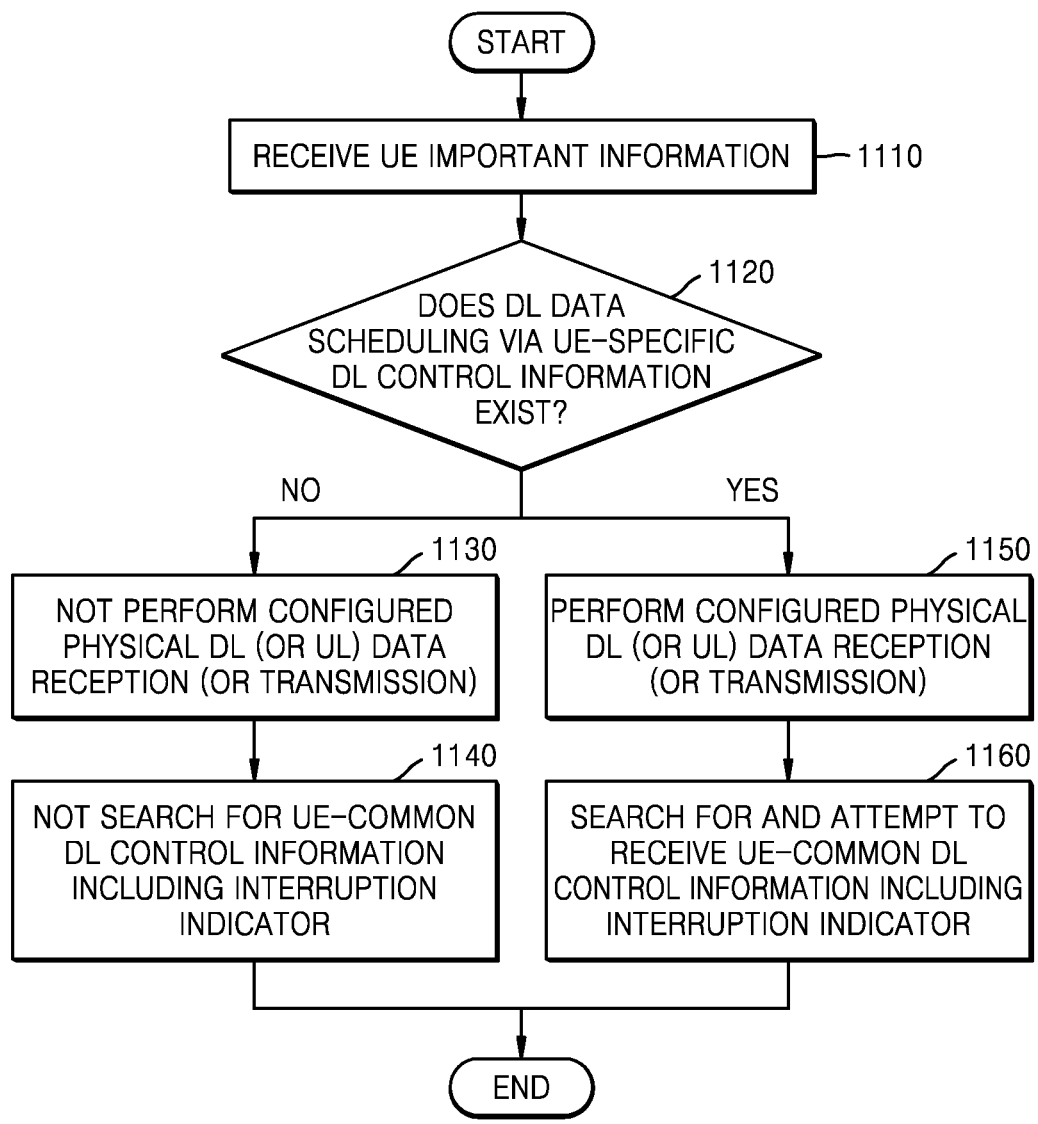
FIG. 11 is a flowchart for describing a method, performed by a UE, of searching for an interruption indicator, according to an embodiment.

FIG. 11 is a flowchart for describing a method, performed by a UE, of searching for an interruption indicator, according to an embodiment.

In operation 1110, the UE may receive UE important information. Here, the UE important information may include one or a combination of the following.

1. Mapping of a physical channel resource domain in which UE-common control information such as PSS/SSS/PBCH and paging is transmitted via a DL according to UE-specific or LIE-common upper signaling or the standard 2. Slot configuration information configured for a DL, an UL, or another purpose, which is indicated by a slot format indicator 3. Pre-configured fixed DL or UL slot (or a symbol, a symbol group, or a particular SFN)

In operation 1120, the UE may determine whether a DL data physical channel resource scheduled via a UE-specific or UE-common control channel exists.

The UE according to an embodiment may determine, by performing blind decoding, whether the DL data physical channel resource scheduled via the UE-specific or LE-common control channel exists.

In operation 1130, the UE may not receive DL data when DL data allocation information is not detected.

In operation 1140, the UE may not perform searching for a UE-specific or UE-common DL control channel in which DCI including interruption indicator is transmitted. According to another embodiment, the UE may not search for a format of particular DCI including the interruption indicator, or, when a RNTI separately configured for interruption indicator information exists, the UE may not search for the interruption indicator, based on the RNTI. However, when the searching of the interruption indicator is pre-configured via UE-specific or UE-common upper signaling, the UE may perform searching. When a plurality of operational frequency BWPs exist, the UE may be configured, via UE-specific or UE-common upper signaling, with respect to detection of the interruption indicator information and whether to configure configuration information, according to each of the frequency BWPs.

In operation 1150, the UE may receive DL data from a DL data physical channel resource domain indicated by the DCI.

When the DL data allocation information is detected in aforementioned operation 1120, the UE according to an embodiment may receive the DL data from the DL data physical channel resource domain indicated by the DCI.

In operation 1160, the UE may search for the UE-specific or UE-common DL control channel in which the DCI including the interruption indicator is transmitted.

According to another embodiment, the UE searches for the format of the particular DCI including the interruption indicator, or when a RNTI separately configured for interruption exists, the UE may search for the interruption indicator information, based on the RNTI.

The UE may determine validity of information about a bit field for a pre-configured frequency bandwidth in which interruption may occur or a pre-configured time period in which interruption may occur, which is included in the interruption indicator, based on the UE important information received before scheduling of actual DL data corresponding to the interruption is received. The bit field may be configured to compose the interruption indicator, assuming that any one of the pre-configured frequency bandwidth in which interruption may occur or the pre-configured time period in which interruption may occur is a DL data physical channel resource, but validity of the pre-configured actual bit field may be configured based on an actual DL data physical channel resource domain determined based on the UE important information. The UE may determine existence or non-existence of interruption with respect to only the actual DL data physical channel resource domain, based on the bit field pre-configured in the interruption indicator.

Also, the UE may ignore existence or non-existence of interruption with respect to a domain that is not the actual DL data physical channel resource domain, may not perform a particular operation associated with the interruption, or may perform an operation according to a pre-configured purpose on a corresponding physical channel resource domain.

When the UE confirms existence or non-existence of interruption with respect to the actual DL data physical channel resource domain, the UE does not store, in a buffer, a received data value of the DL data physical channel resource domain, the received data value corresponding to the interruption. Also, the UE may perform re-decoding on each of code blocks, excluding a resource domain in which an interruption occurred.

Figure 12:
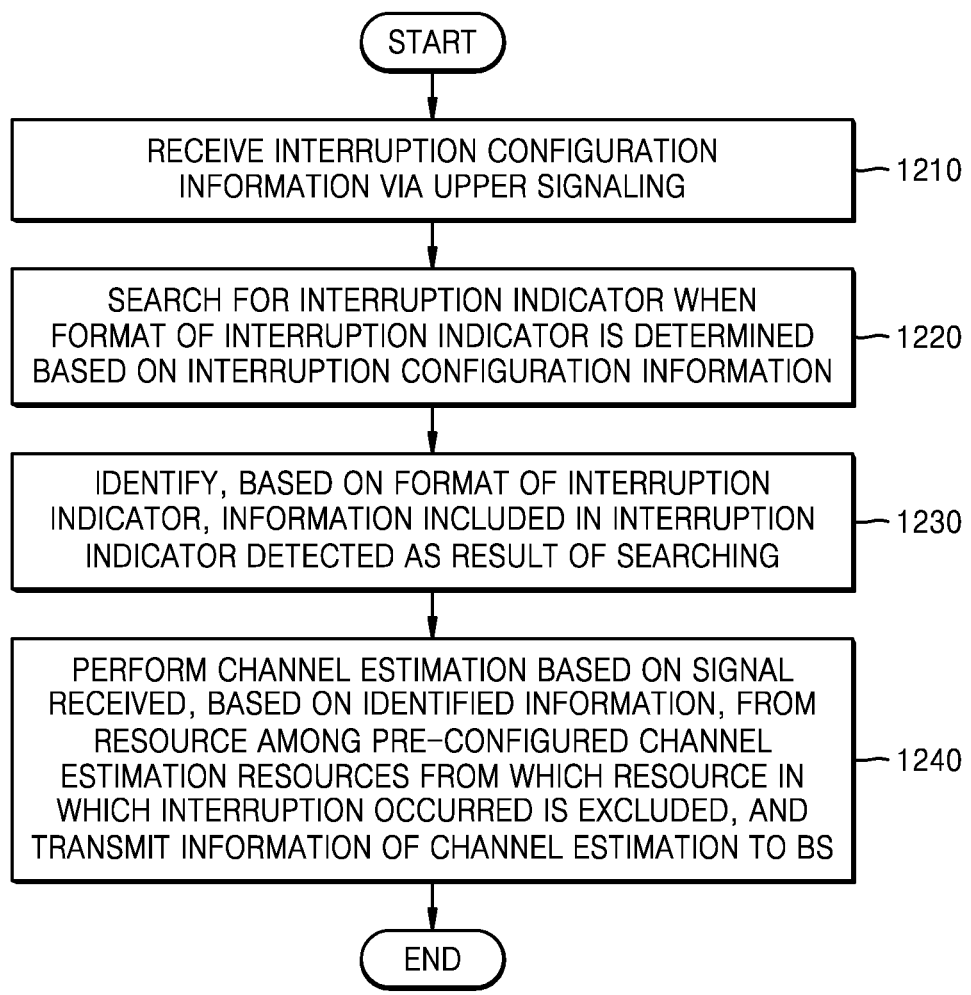
FIG. 12 is a flowchart for describing a method, performed by a UE, of estimating a channel when an interruption occurs, according to an embodiment.

FIG. 12 is a flowchart for describing a method, performed by a UE, of estimating a channel when an interruption occurs, according to an embodiment.

In operation 1210, the UE may receive interruption configuration information via upper signaling.

Operation 1210 may correspond to operation 810 described above with reference to FIG. 8.

In operation 1220, the UE may search for an interruption indicator when a format of the interruption indicator is determined based on the interruption configuration information.

Operation 1220 may correspond to operation 820 described above with reference to FIG. 8.

In addition to operation 820 described above with reference to FIG. 8, according to another embodiment, when the UE is configured to search for DCI indicating reception of a channel estimation resource, the UE may search for DCI including an interruption indicator. According to another embodiment, when the UE searches for DCI indicating reception of a channel estimation resource, the UE may search for DCI including an interruption indicator. According to another embodiment, when the UE is configured with a channel estimation resource via UE-specific or UE-common upper signaling, the UE may search for DCI including an interruption indicator.

In operation 1230, the UE may identify, based on the format of the interruption indicator, information included in the interruption indicator detected as a result of the searching.

Operation 1230 may correspond to operation 830 described above with reference to FIG. 8.

In operation 1240, the UE may perform channel estimation based on a signal received, based on the identified formation, from a resource among pre-configured channel estimation resources from which a resource in which an interruption occurred is excluded, and may transmit information about the channel estimation to a BS.

After the UE according to an embodiment receives and interprets interruption information, the UE may determine whether interruption actually occurred in the channel estimation resource configured via L1 signaling or upper signaling.

When the interruption does not occur in the channel estimation resource, the UE may perform estimation on a DL channel via the channel estimation resource. The UE may transmit a result value of the estimation to the BS via a pre-configured UL control or data channel.

According to another embodiment, when the interruption occurs in the channel estimation resource, the UE may determine a valid channel estimation resource domain from among the pre-configured channel estimation resources. Also, the UE may determine whether to transmit, to the BS, channel estimation information about the valid channel estimation resource domain. For example, when a ratio of the valid channel estimation resource domain to the pre-configured channel estimation resources is equal to or greater than a predefined threshold value or an absolute value of the valid channel estimation resource domain is equal to or greater than a predefined threshold value, the UE may perform channel estimation with respect to the valid channel estimation resource domain. The UE may transmit a channel estimation value obtained as a result of the channel estimation to the BS via the pre-configured UL control or data channel. According to another embodiment, when the ratio of the valid channel estimation resource domain to the pre-configured channel estimation resources is equal to or smaller than the predefined threshold value or the absolute value of the valid channel estimation resource domain is equal to or smaller than the predefined threshold value, the UE may not perform channel estimation with respect to the valid channel estimation resource domain. Accordingly, the UE may not transmit channel estimation information to the BS via the pre-configured UL control or data channel or may transmit a previously obtained channel estimation value.

Figure 13:
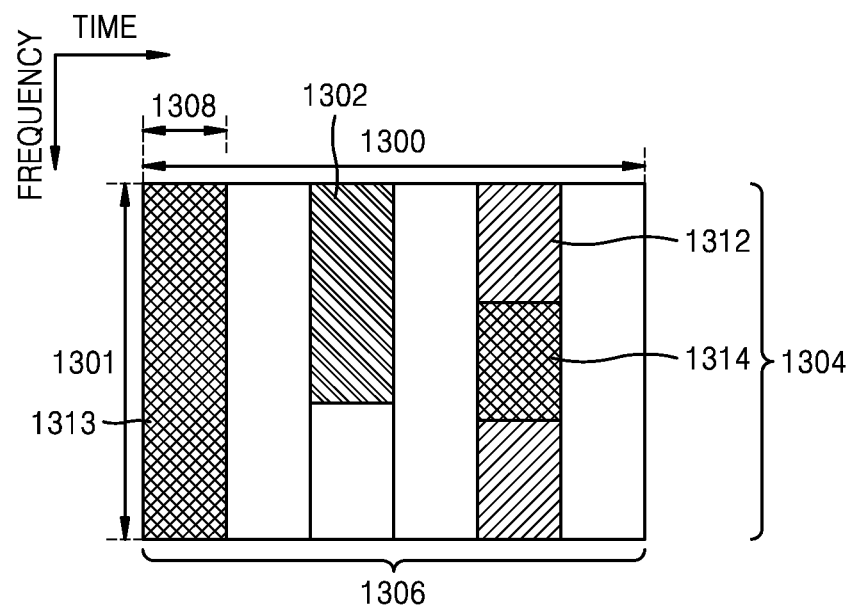
FIG. 13 illustrates resource domain information that may be indicated by an interruption indicator based on particular resource configuration information, according to an embodiment.

FIG. 13 illustrates resource domain information that may be indicated by an interruption indicator based on particular resource configuration information, according to an embodiment.

Referring to FIG. 13, the UE may be configured, via upper signaling, with information about a frequency 1301 and a time 1300 in which interruption may occur, the information being indicated by an interruption indicator. The information about the frequency 1301 may indicate an entire system frequency bandwidth, a partial frequency bandwidth composed of PRB units, or a particular BWP. A unit 1308 of time information may be a symbol, a symbol group, a slot, or a slot group unit. The time information or the frequency information may be successive or non-successive. Also, the UE may be simultaneously configured, via upper signaling, with a plurality of pieces of the information about the frequency 1301 and the time 1300 in which interruption may occur, the information being indicated by an interruption indicator.

The UE may be configured with a DCI transmission period, or a frequency resource domain 1301 via upper signaling or L1 signaling. The UE may be configured with a reserved resource information transmission period or a time and frequency resource domain 1302 via upper signaling or L1 signaling. A reserved resource refers to a resource the BS may configure, for a different purpose, to a separate UE, group common UEs, or common UEs, and the UE may determine that the UE does not perform channel estimation or data transmission and reception in the reserved resource. A channel estimation resource 1312 may be allocated to the UE via upper signaling or L1 signaling. When the UE succeeds in searching for a format of DCI including a pre-configured interruption indicator by using the aforementioned information, interpretation of bit fields constituting the DCI may adaptively vary according to an actually valid DL data (or channel estimation) time resource domain 1306 and frequency resource domain 1304. For example, when only four symbols (or symbol groups) from among a total of six symbols (or symbol groups) correspond to a valid symbol (or a symbol group) as resource configuration for valid DL data or channel estimation as shown in FIG. 13, the UE may configure the bit fields according to the corresponding symbol (or symbol group).

Also, when the channel estimation resource 1312 (or a data allocation resource) and a domain configured with the information about the frequency 1301 and the time 1300 in which interruption may occur, the information being indicated by an interruption indicator, partially overlap with each other, the UE may search for control information including the interruption indicator. According to another embodiment, when the UE searches for control information indicating channel estimation resource (or data allocation resource) information, the LTE may search for the control information including the interruption indicator. According to another embodiment, when the UE searches for control information including a CRC scrambled with an RNTI associated with the channel estimation resource or data allocation resource information, the UE may search for the control information including the interruption indicator.

As a result of searching for, by the UE according to an embodiment, the DCI including the interruption indicator, when at least a part of an interrupted physical channel resource domain 1314 overlaps with the pre-allocated channel estimation resource (or data resource) 1312, the UE may perform channel estimation on a resource domain that is not interrupted and from which the overlapped part is excluded. For the data resource, the UE may perform (re)demodulation/(re)decoding on a resource domain that is not interrupted and from which the overlapped part is excluded.

Figure 14:
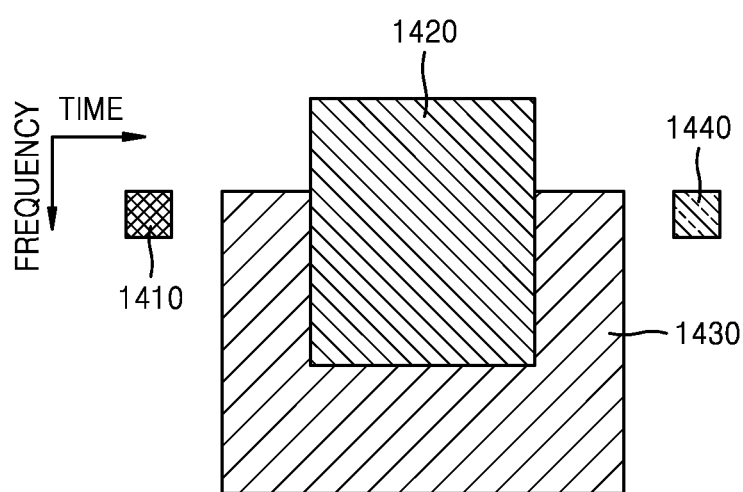
FIG. 14 is a diagram for describing an operation of searching for an interruption, the operation being performed by a UE, according to an embodiment.

FIG. 14 is a diagram for describing an operation of searching for interruption, the operation being performed by a UE, according to an embodiment.

Referring to FIG. 14, the UE may be configured with a UE-specific or UE-common control information search space 1410 via upper signaling. The UE may be scheduled, via the control information search space 1410, with a data channel resource domain 1420 in which UE-specific or UE-common data information is transmitted. When the UE is configured, via upper signaling, with respect to whether to search for the interruption indicator, the UE may be (re) configured or separately configured, via UE-specific or UE-common upper signaling, with information indicating whether to search for the interruption indicator along with a resource domain 1430 that may be interrupted and may be indicated by the interruption indicator. Also, a DL control area 1440 in which control information including the interruption indicator is transmitted may be pre-configured via upper signaling. When the UE is configured to search for the interruption indicator, the UE may determine whether at least a part of the scheduled physical data resource domain 1420 overlaps with the resource domain 1430 that may be interrupted and may be indicated by the interruption indicator.

As a result of the determination, when at least the part of the scheduled physical data resource domain 1420 overlaps with the resource domain 1430 that may be interrupted and may be indicated by the interruption indicator, the UE may search for the DCI including the interruption indicator via a DL control channel. As a result of the determination, when at least the part of the scheduled physical data resource domain 1420 does not overlap with the resource domain 1430 that may be interrupted and may be indicated by the interruption indicator, the UE may not search for the DCI including the interruption indicator via the DL control channel.

A time resource in the resource domain 1430 that may be interrupted and may be indicated by the interruption indicator may be composed of symbol units, slot units, or a combination thereof. Also, a frequency resource in the resource domain 1430 that may be interrupted and may be indicated by the interruption indicator may be an actual frequency BWP operated by the UE, an entire system frequency bandwidth, a PRB unit, a PRB group unit, or a BWP unit for an initial access.

According to another embodiment, the resource domain 1430 that may be interrupted and may be indicated by the interruption indicator and at least a part of a frequency bandwidth overlap with a BWP that is configured or indicated to the UE via UE-specific upper signaling or L1 signaling, the UE may search for the including the interruption indicator.

Figure 15:
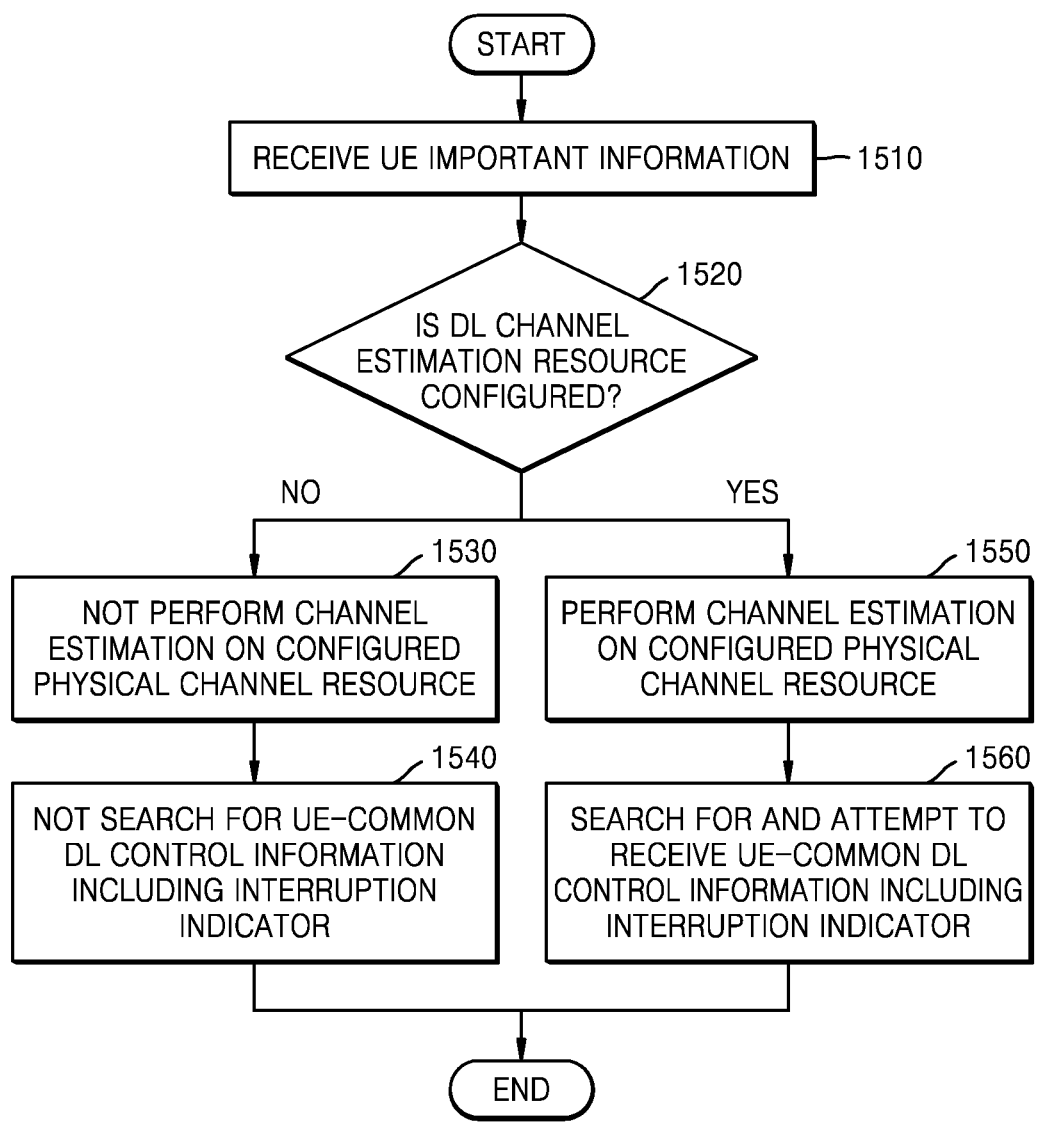
FIG. 15 is a flowchart for describing a method, performed by a UE, of estimating a channel based on a result of searching for an interruption indicator, according to an embodiment.

FIG. 15 is a flowchart for describing a method, performed by a UE, of estimating a channel based on a result of searching for an interruption indicator, according to an embodiment.

In operation 1510, the UE may receive UE important information.

Operation 1510 may correspond to operation 1110 described above with reference to FIG. 11.

In operation 1520, the UE may determine whether a DL channel estimation resource exists, via UE-specific or UE-common upper signaling. Also, the UE may determine whether the DL channel estimation resource exists, via a DL control channel.

In operation 1530, because the DL channel estimation resource does not exist, the UE may not perform estimation on a physical channel resource. Also, when the UE is not configured with the DL channel estimation resource via upper signaling, the UE may not perform channel estimation.

In operation 1540, the UE may not search for a UE-specific or UE-common DL control channel in which DCI including the interruption indicator is transmitted.

According to another embodiment, the UE may not search for a format of particular DCI including an interruption indicator, or when an RNTI separately configured for an interruption indicator exists, the UE may not search for interruption indicator information, based on the RNTI.

However, when the searching of the interruption indicator is pre-configured via UE-specific or UE-common upper signaling, the UE may perform searching. When a plurality of operational frequency BWPs exist, the UE may be configured, via UE-specific or UE-common upper signaling, with respect to detection of the interruption indicator information and whether to configure configuration information, according to each of the frequency BWPs.

In operation 1550, when the physical channel resource for DL channel estimation exists, the UE may perform the DL channel estimation in a resource domain configured via upper signaling or L1 signaling. According to another embodiment, when the UE is configured with the physical channel resource for DL channel estimation via upper signaling, the UE may perform the DL channel estimation in the resource domain configured via upper signaling or L1 signaling.

In operation 1560, the UE may search for the UE-specific or UE-common DL control channel in which the DCI including the interruption indicator is transmitted.

According to another embodiment, the UE searches for the format of the particular DCI including the interruption indicator, or when the RNTI separately configured for the interruption indicator exists, the UE may search for the interruption indicator, based on the RNTI. The UE may determine validity of information about a bit field for a frequency bandwidth in which interruption may occur or a time period in which interruption may occur, which is included in the interruption indicator, based on the UE important information received before scheduling of actual DL data corresponding to the interruption is received.

According to an embodiment, the bit field may be configured to compose the interruption indicator, assuming that any one of the pre-configured frequency bandwidth in which interruption may occur or the time period in which interruption may occur is a DL data physical channel resource, but validity of the pre-configured actual bit field may be configured based on an actual DL data physical channel resource domain determined based on the UE important information. That is, the UE may determine existence or non-existence of interruption with respect to only the actual DL data physical channel resource domain, based on the bit field pre-configured in the interruption indicator. According to another embodiment, the UE may ignore existence or non-existence of interruption with respect to a domain that is not the actual DL data physical channel resource domain, may not perform a particular operation associated with the interruption, or may perform an operation according to a pre-configured purpose on a corresponding physical channel resource domain.

When the UE checked existence or non-existence of interruption with respect to a DL channel estimation resource domain, the UE may not include an estimation value to calculation of a value for a channel estimation report or may not perform the channel estimation report, the estimation value corresponding to the DL channel estimation resource domain corresponding to the interruption. Also, the UE may perform re-decoding on each of code blocks, excluding a resource domain in which an interruption occurred.

Figure 16:
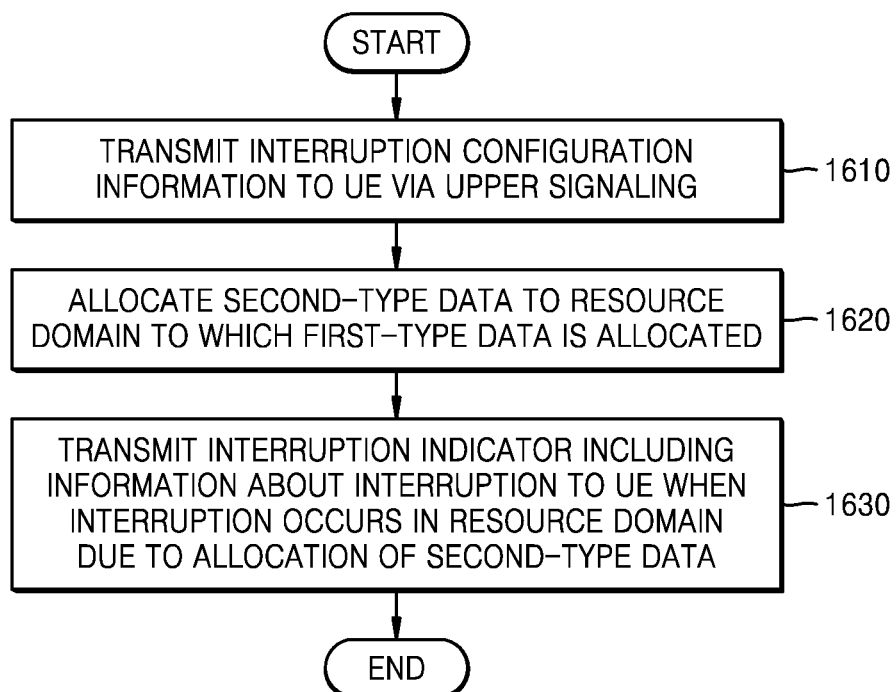
FIG. 16 is a flowchart for describing a method, performed by a base station (BS), of transmitting interruption information, according to an embodiment.

FIG. 16 is a flowchart for describing a method, performed by a BS, of transmitting interruption information, according to an embodiment.

In operation 1610, the BS may transmit interruption configuration information to a UE via upper signaling.

According to an embodiment, the BS may transmit the interruption configuration information to the UE via UE-specific or UE-common upper signaling. The interruption configuration information may include a physical resource domain being indicative by the interruption information and a physical resource domain in which the interruption information is transmitted.

The interruption configuration information may include one or a combination of at least two of frequency information, time information, transmit source information, whether or not information is to be changed, and RNTI information. Each information included in the interruption configuration information may correspond to the descriptions provided above with reference to operation 810 of FIG. 8.

In operation 1620, the BS may allocate second-type data to a resource domain to which first-type data is allocated.

According to a characteristic of a service, the BS according to an embodiment may transmit data of the service which is requested to be first transmitted, even when another data is allocated to a resource. In this regard, the first-type data may be data of eMBB service or data of mMTC, and the second-type data may be data of URLLC service. However, this is merely an example, and thus the first-type data and the second-type data are not limited to the aforementioned descriptions.

In operation 1630, when an interruption occurs in the resource domain due to allocation of the second-type data, the BS may transmit an interruption indicator including information about the interruption to the UE.

When the BS allocates different types of data to a same resource domain in an overlapping manner, an interruption may occur. Accordingly, the BS may transmit an interruption indicator including information about the interruption to the UE.

However, this is merely an example, and, as described above with reference to FIG. 5, the BS may provide information about interruption to the UE by using one of six types of an interruption indicator.

Figure 17:
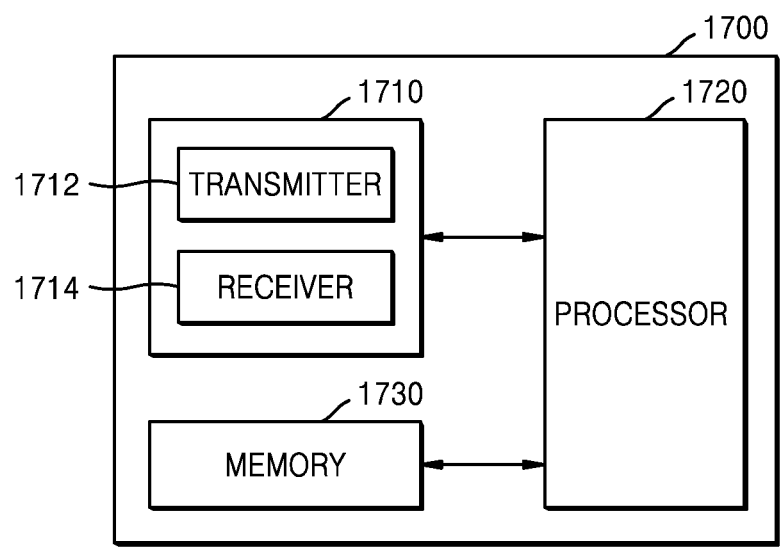
FIG. 17 is a block diagram of a LIE according to an embodiment.

FIG. 17 is a block diagram of a UE 1700 according to an embodiment.

Referring to FIG. 17, the UE 1700 may include a transceiver 1710, a processor 1720, and a memory 1730.

The transceiver 1710 may consist of a transmitter 1712 and a receiver 1714, but in the present embodiment, they are collectively referred to as the transceiver 1710.

The transceiver 1710 may transmit and receive a signal to and from a BS. The signal may include control information and data. To this end, the transceiver 1710 may include a RF transmitter for up-converting a frequency of and amplifying signals to be transmitted, and an RF receiver for low-noise-amplifying and down-converting a frequency of received signals. Also, the transceiver 1710 may receive signals through radio channels and output the signals to the processor 1720, and may transmit signals output from the processor 1720, through radio channels. The processor 1720 may control a series of procedures to operate the UE according to the embodiments described above with reference to FIGS. 1 to 15. For example, the processor 1720 may determine a format of the interruption indicator, based on interruption configuration information received from the BS. Also, the processor 1720 may search for the interruption indicator. The processor 1720 may identify information included in the interruption indicator, based on the format of the interruption indicator detected via the searching.

The memory 1730 may store the interruption configuration information, the information included in the interruption indicator, or the like, and may have an area in which data for control by the 1720 and data to occur during control by the processor 1720 are stored. The memory 1730 may be implemented as one of various memories including ROM, RAM, hard disk, CD-ROM or/and DVD.

Figure 18:
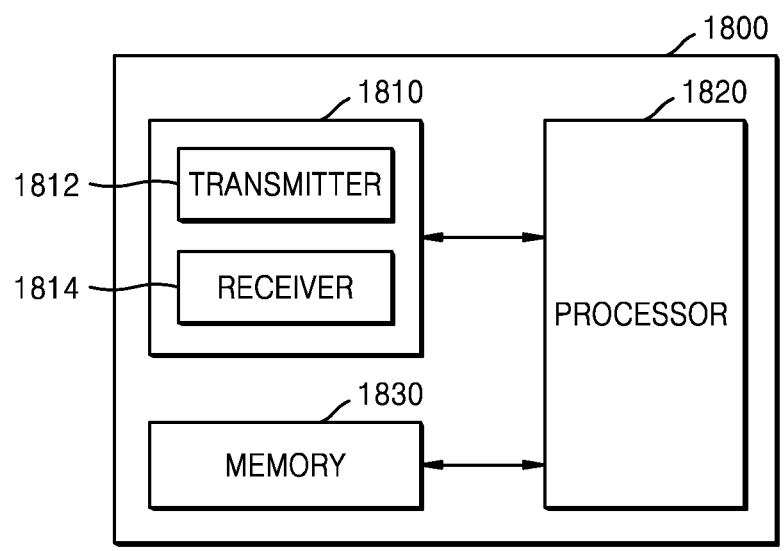
FIG. 18 is a block diagram of a BS according to an embodiment.

FIG. 18 is a block diagram of a BS 1800 according to an embodiment.

Referring to FIG. 18, in an embodiment, the BS 1800 may include a transceiver 1810, a processor 1820, and a memory 1830.

The transceiver 1810 may consist of a transmitter 1812 and a receiver 1814, but in the present embodiment, they are collectively referred to as the transceiver 1810. The transceiver 1810 may transmit and receive a signal to and from a UE. The signal may include control information and data. To this end, the transceiver 1810 may include a RF transmitter for up-converting a frequency of and amplifying signals to be transmitted, and an RF receiver for low-noise-amplifying and down-converting a frequency of received signals. Also, the transceiver 1810 may receive signals through radio channels and output the signals to the processor 1820, and may transmit signals output from the processor 1820, through radio channels. The processor 1820 may control a series of procedures to operate the BS according to the aforementioned embodiments of the disclosure. For example, the processor 1820 may generate interruption configuration information. Also, the processor 1820 may generate an interruption indicator according to a format based on the interruption configuration information.

The memory 1830 may store the interruption configuration information, information included in the interruption indicator, or the like, and may have an area in which data for control by the 1820 and data to occur during control by the processor 1820 are stored. The memory 1830 may be implemented as one of various memories including ROM, RAM, hard disk, CD-ROM or/and DVD.

The embodiments of the disclosure described above with reference to the attached drawings are provided merely to achieve convenience of explanation and to promote understanding of the disclosure, and do not limit the scope of the disclosure. That is, it will be understood by one of ordinary skill in the art that modifications thereof based on the technical aspects of the disclosure may be implemented. The embodiments of the disclosure may operate in combination as necessary. For example, a BS and a UE may operate based on a combination of parts of embodiments of the disclosure. Although the embodiments have been described based on NR systems, modifications thereof based on the technical aspects of the embodiments may also be applied to other systems such as FDD or TDD LTE systems or the like.

The exemplary embodiments of the disclosure are provided with reference to the specification and the accompanying drawings. The terminology used herein is for the purpose of describing particular embodiments and promoting an understanding of the disclosure only and is not intended to be limiting of the disclosure. While the embodiments have been described with reference to the drawings, it will be understood by one of ordinary skill in the art that modifications thereof based on the technical aspects of the disclosure may be implemented.

What is claimed:
1. A method performed by a user equipment (UE) in a wireless communication system, the method comprising:
obtaining a Radio Network Temporary Identifier (RNTI) for monitoring a physical downlink control channel (PDCCH) conveying downlink control information (DCI) including pre-emption indication information;
performing monitoring on the PDCCH conveying the DCI including the pre-emption indication information based on the RNTI; and
when the DCI including the pre-emption indication information is detected, determining that no transmission for the UE is present in a physical resource block (PRB) and a symbol from a set of PRBs and a set of symbols,
wherein the PRB and the symbol are indicated by the DCI, and
wherein a symbol indicated as an uplink (UL) is excluded from the set of symbols indicated by the DCI.

2. The method of claim 1, wherein the set of PRBs corresponds to a bandwidth part (BWP) including a plurality of PRBs.

3. The method of claim 1, further comprising:
obtaining UE specific control information including slot format indication information;
identifying that the symbol indicated as the UL by the slot format indication information is excluded from the set of symbols indicated by the DCI; and
identifying a number K of symbols as a result of excluding the symbol indicated as the UL by the slot format indication information from the set of symbols indicated by the DCI including the pre-emption indication information.

4. The method of claim 3, wherein the pre-emption indication information is configured with N bits, and
wherein the method further comprises:
receiving indication information for the set of PRBs and the set of symbols;
in case that the indication information for the set of PRBs and the set of symbols indicates a first value, identifying N symbol groups of consecutive symbols from the set of symbols, wherein each of N symbol groups one-to-one corresponds to each of the N bits and the N symbol groups of consecutive symbol includes a first symbol group including $$\left\lceil \frac{k}{n} \right\rceil$$

symbols and a second symbol group including $$\left\lfloor \frac{k}{n} \right\rfloor$$

symbols; and
in case that the indication information for the set of PRBs and the set of symbols indicates a second value, identifying N/2 symbol groups symbols of consecutive symbols from the set of symbols, wherein the N bits includes N/2 bits indicating symbol information associated with pre-emption and N/2 bits indicating PRB information associated with pre-emption.

5. The method of claim 1, wherein the DCI includes a plurality of pre-emption indications, and
wherein each of the plurality of pre-emption indications includes 14 bits.

6. A method performed by a base station (BS) in a wireless communication system, the method comprising:
providing, to a user equipment (UE), a Radio Network Temporary Identifier (RNTI) for monitoring a physical downlink control channel (PDCCH) conveying downlink control information (DCI) including pre-emption indication information; and
transmitting, to the UE, the DCI including the pre-emption indication information via the PDCCH,
wherein a physical resource block (PRB) and a symbol, which are indicated by the DCI comprising the pre-emption indicator, from a set of PRBs and a set of symbols are configured not to allow transmission for the UE, and
wherein a symbol indicated as an uplink (UL) is excluded from the set of symbols indicated by the DCI.

7. The method of claim 6, wherein the set of PRBs corresponds to a bandwidth part (BWP) including a plurality of PRBs.

8. The method of claim 6, further comprising:
providing, to the UE, UE specific control information including slot format indication information,
wherein the symbol indicated as the UL by the slot format indication information is excluded from the set of symbols indicated by the DCI including the pre-emption indication information; and
wherein a number K of symbols is identified as a result of excluding the symbol indicated as the UL by the slot format indication information from the set of symbols indicated by the DCI including the pre-emption indication information.

9. The method of claim 8, further comprising:
providing, to the UE, indication information for the set of PRBs and the set of symbols,
wherein the pre-emption indication information is configured with N bits,
wherein N symbol groups of consecutive symbols from the set of symbols are identified in case that the indication information for the set of PRBs and the set of symbols indicates a first value, where each of N symbol groups one-to-one corresponds to each of the N bits and the N symbol groups of consecutive symbol includes a first symbol group including $$\left\lceil \frac{k}{n} \right\rceil$$

symbols and a second symbol group including $$\left\lfloor \frac{k}{n} \right\rfloor$$

symbols, and
wherein N/2 symbol groups symbols of consecutive symbols from the set of symbols are identified in case that the indication information for the set of PRBs and the set of symbols indicates a second value where the N bits includes N/2 bits indicating symbol information associated with pre-emption and N/2 bits indicating PRB information associated with pre-emption.

10. The method of claim 6, wherein the DCI includes a plurality of pre-emption indications, and
wherein each of the plurality of pre-emption indications includes 14 bits.

11. A user equipment (UE) in a wireless communication system, the UE comprising:
a transceiver; and
at least one processor configured to:
obtain a Radio Network Temporary Identifier (RNTI) for monitoring a physical downlink control channel (PDCCH) conveying downlink control information (DCI) including pre-emption indication information,
perform monitoring on the PDCCH conveying the DCI including the pre-emption indication information based on the RNTI, and
when the DCI including the pre-emption indication information is detected, determine that no transmission for the UE is present in a physical resource block (PRB) and a symbol from a set of PRBs and a set of symbols,
wherein the PRB and the symbol are indicated by the DCI, and
wherein a symbol indicated as an uplink (UL) is excluded from the set of symbols indicated by the DCI.

12. The UE of claim 11, wherein the set of PRBs corresponds to a bandwidth part (BWP) including a plurality of PRBs.

13. The UE of claim 11, wherein the at least one processor is further configured to:
obtain UE specific control information including slot format indication information,
identify that the symbol indicated as the UL by the slot format indication information is excluded from the set of symbols indicated by the DCI, and
identify a number K of symbols as a result of excluding the symbol indicated as the UL by the slot format indication information from the set of symbols indicated by the DCI including the pre-emption indication information.

14. The UE of claim 13, wherein the pre-emption indication information is configured with N bits, and
wherein the at least one processor is further configured to:
receive indication information for the set of PRBs and the set of symbols,
in case that the indication information for the set of PRBs and the set of symbols indicates a first value, identify N symbol groups of consecutive symbols from the set of symbols, wherein each of N symbol groups one-to-one corresponds to each of the N bits and the N symbol groups of consecutive symbol includes a first symbol group including $$\left\lceil \frac{k}{n} \right\rceil$$

symbols and a second symbol group including $$\left\lceil \frac{k}{n} \right\rceil$$

symbols, and
in case that the indication information for the set of PRBs and the set of symbols indicates a second value, identify N/2 symbol groups symbols of consecutive symbols from the set of symbols, wherein the N bits includes N/2 bits indicating symbol information associated with pre-emption and N/2 bits indicating PRB information associated with pre-emption.

15. The UE of claim 11, wherein the DCI includes a plurality of pre-emption indications, and
wherein each of the plurality of pre-emption indications includes 14 bits.

16. A base station (BS) in a wireless communication system, the BS comprising:
a transceiver; and
at least one processor configured to:
provide, to a user equipment (UE), a Radio Network Temporary Identifier (RNTI) for monitoring a physical downlink control channel (PDCCH) conveying downlink control information (DCI) including pre-emption indication information, and
transmit, to the UE, the DCI including pre-emption indication information via PDCCH,
wherein a physical resource block (PRB) and a symbol which are indicated by the DCI comprising the pre-emption indicator from a set of PRBs and a set of symbols are configured not to allow transmission for the UE, and
wherein a symbol indicated as an uplink (UL) is excluded from the set of symbols indicated by the DCI.

17. The BS of claim 16, wherein the set of PRBs corresponds to a bandwidth part (BWP) including a plurality of PRBs.

18. The BS of claim 16, wherein the at least one processor is further configured to:
provide, to the UE, UE specific control information including slot format indication information,
wherein the symbol indicated as the UL by the slot format indication information is excluded from the set of symbols indicated by the DCI including the pre-emption indication information, and
wherein a number K of symbols is identified as a result of excluding the symbol indicated as the UL by the slot format indication information from the set of symbols indicated by the DCI including the pre-emption indication information.

19. The BS of claim 18, wherein the at least one processor is further configured to:
provide, to the UE, indication information for the set of PRBs and the set of symbols,
wherein the pre-emption indication information is configured with N bits,
wherein N symbol groups of consecutive symbols from the set of symbols are identified in case that the indication information for the set of PRBs and the set of symbols indicates a first value, where each of N symbol groups one-to-one corresponds to each of the N bits and the N symbol groups of consecutive symbol includes a first symbol group including $$\left\lceil \frac{k}{n} \right\rceil$$

symbols and a second symbol group including $$\left\lfloor \frac{k}{n} \right\rfloor$$

symbols, and
wherein N/2 symbol groups symbols of consecutive symbols from the set of symbols are identified in case that the indication information for the set of PRBs and the set of symbols indicates a second value where the N bits includes N/2 bits indicating symbol information associated with pre-emption and N/2 bits indicating PRB information associated with pre-emption.

20. The BS of claim 16, wherein the DCI includes a plurality of pre-emption indications, and
wherein each of the plurality of pre-emption indications includes 14 bits.

* * * * *